(12) United States Patent
Sun et al.

(10) Patent No.: US 10,270,374 B2
(45) Date of Patent: Apr. 23, 2019

(54) MOTOR DRIVING CIRCUIT, MOTOR DRIVING METHOD, AND MOTOR UTILIZING THE SAME

(71) Applicant: JOHNSON ELECTRIC INTERNATIONAL AG, Murten (CH)

(72) Inventors: Chi Ping Sun, Hong Kong (CN); Fei Xin, Shen Zhen (CN); Shing Hin Yeung, Hong Kong (CN); Xiu Wen Yang, Shen Zhen (CN); Shu Juan Huang, Shen Zhen (CN); Yun Long Jiang, Shen Zhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/606,545

(22) Filed: May 26, 2017

(65) Prior Publication Data

US 2017/0346421 A1 Nov. 30, 2017

(30) Foreign Application Priority Data

May 30, 2016 (CN) .......................... 2016 1 0375812

(51) Int. Cl.
  *H02P 6/182* (2016.01)
  *H02K 21/14* (2006.01)
  *H02P 27/06* (2006.01)

(52) U.S. Cl.
  CPC ............. *H02P 6/182* (2013.01); *H02K 21/14* (2013.01); *H02P 27/06* (2013.01)

(58) Field of Classification Search
  CPC ............ H02P 6/12; H02P 27/06; H02K 21/14

USPC .................................................... 318/400.35
See application file for complete search history.

(56) References Cited

U.S. PATENT DOCUMENTS

| 4,002,959 | A | * | 1/1977 | Schadlich | ............... | H02P 25/14 318/245 |
| 4,369,403 | A | * | 1/1983 | Lee | .......................... | H02P 23/26 318/729 |
| 4,658,692 | A | * | 4/1987 | Bagus | .................... | G10H 1/047 318/811 |
| 4,949,214 | A | * | 8/1990 | Spencer | .................. | G03G 15/16 361/42 |
| 4,958,118 | A | * | 9/1990 | Pottebaum | ............... | H02P 25/04 318/727 |
| 5,249,118 | A | * | 9/1993 | Smith | ................... | G05B 19/416 318/568.18 |
| 5,420,397 | A | * | 5/1995 | Weiss | .................. | G05D 23/2401 219/492 |

(Continued)

*Primary Examiner* — Kawing Chan
(74) *Attorney, Agent, or Firm* — Muncy, Geissler, Olds & Lowe, P.C.

(57) ABSTRACT

A motor driving circuit, the motor itself, and a motor driving method are disclosed. The circuit includes a controllable bidirectional alternating current (AC) switch and a processing unit, a voltage polarity of the AC power source and zero voltage crossing point of an AC power source being detected, together with a magnetic pole position of a permanent-magnet rotor, to govern the operation of the AC switch. When the controllable bidirectional AC switch is to be switched on, a trigger pulse is output after a delay time after the zero voltage crossing point, such that a phase difference between a back electromotive force and current flowing through the stator winding is decreased.

20 Claims, 19 Drawing Sheets

(56) References Cited

U.S. PATENT DOCUMENTS

| | | | | |
|---|---|---|---|---|
| 5,434,491 | A * | 7/1995 | Marioni | H02P 1/465 318/700 |
| 5,648,705 | A * | 7/1997 | Sitar | H02J 7/1492 318/145 |
| 5,675,226 | A * | 10/1997 | Riola' | H02K 29/03 318/400.26 |
| 5,682,459 | A * | 10/1997 | Wilkerson | H02P 7/2855 318/109 |
| 5,814,966 | A * | 9/1998 | Williamson | H02P 27/02 318/787 |
| 6,239,563 | B1 * | 5/2001 | Kunz | H02P 1/465 318/400.07 |
| 6,346,790 | B1 * | 2/2002 | Kemp | H02P 25/04 318/729 |
| 6,614,197 | B2 * | 9/2003 | Berringer | H02M 5/2576 318/245 |
| 6,982,539 | B1 * | 1/2006 | Ward | H02P 1/445 318/778 |
| 7,446,493 | B2 * | 11/2008 | Forster | H02M 5/2576 318/400.22 |
| 8,487,570 | B2 * | 7/2013 | Walter | H02P 25/14 318/400.14 |
| 2002/0190665 | A1 * | 12/2002 | Sun | H05B 41/2883 315/224 |
| 2004/0145336 | A1 * | 7/2004 | Marioni | H02K 29/08 318/717 |
| 2005/0253539 | A1 * | 11/2005 | Kushida | H02P 25/14 318/98 |
| 2006/0043918 | A1 * | 3/2006 | Kemp | H02K 17/30 318/437 |
| 2007/0271915 | A1 * | 11/2007 | Safran | F03G 7/06 60/531 |
| 2008/0284360 | A1 * | 11/2008 | Sepe, Jr. | H02P 6/006 318/135 |
| 2010/0207557 | A1 * | 8/2010 | Wilkinson | H02P 1/22 318/400.15 |
| 2011/0006721 | A1 * | 1/2011 | Gonthier | H02P 1/445 318/772 |
| 2014/0167659 | A1 * | 6/2014 | Handa | H02P 21/0035 318/400.02 |
| 2015/0376943 | A1 * | 12/2015 | Slupik | E06B 9/68 318/626 |

* cited by examiner

MOTOR DRIVING CIRCUIT, MOTOR DRIVING METHOD, AND MOTOR UTILIZING THE SAME

CROSS REFERENCE TO RELATED APPLICATIONS

This non-provisional patent application claims priority under 35 U.S.C. § 119(a) from Patent Application No. 201610375812.3 filed in The People's Republic of China on May 30, 2016, the entire contents of which are hereby incorporated by reference.

FIELD OF THE INVENTION

This present disclosure relates to a motor driving technique, and more particularly to a motor driving circuit, a motor driving method, and a motor employing the driving circuit.

BACKGROUND OF THE INVENTION

Synchronous motors are more and more widely used due to their small volumes and high efficiencies. The electromagnetic torque T of a motor can be expressed in terms of co energy Wco as $$T = \frac{\partial Wco}{\partial \theta}\bigg|_{i_{const}}.$$

Self and mutual inductance coefficients of the armature are dependent on the rotor angular position θ, thus, the electromagnetic torque also can be expressed as $$T = \sum_{i=1}^{Z} F_m i_i \frac{dM_{im}(\theta)}{d\theta} + \frac{1}{2}F_m^2 \frac{dP_m}{d\theta},$$

wherein Z is the number of phases, $F_m$ is the equivalent magnetic motive force (MMF) of the magnets, $P_m$ is the magnetic circuit permeance of the magnets, I is the stator winding current, $M_{im}$ is the mutual inductance between a stator winding and the one turn equivalent circuit of the magnets. The electromotive force (EMF) of a stator winding $e_i$ is related to the magnet flux by $$e_i = -\frac{d\phi_{im}}{dt} = -\omega_m F_m \frac{dM_{im}(\theta)}{d\theta},$$

wherein $\phi_{im}$ is the magnetic flux produced by the magnets. From the above two formulas, the electromagnetic torque T can be obtained by $$T = -\sum_{i=1}^{Z} \frac{e_i i_i}{\omega_m} + \frac{1}{2}F_m^2 \frac{dP_m}{d\theta}.$$

Therefore, the product of back electromotive force (Bemf) and motor current contributes to the motor output power. However, if the product of Bemf and motor current is less than 0, i.e. if Bemf and motor current are out of phase, as shown in FIG. 1, then negative torque (−T) will act against positive torque (+T), so the motor power efficiency is reduced.

SUMMARY

Thus, there a desire for a motor driving circuit, a motor driving method, and a motor using the driving circuit, which can improve the motor power efficiency.

According to one aspect, a driving circuit for a motor including a stator and a permanent magnet rotor is provided. The stator includes a stator core and a stator winding wound on the stator core. The driving circuit includes a controllable bidirectional AC switch connected in series with the stator winding between two ends of an AC power source, and a processing unit. The processing unit is configured to detect a zero voltage crossing point and a voltage polarity of the AC power source, and control the controllable bidirectional AC switch to be switched between a switch-on state and a switch-off state in a predetermined way, based on a magnetic pole position of the permanent magnet rotor and the voltage polarity of the AC power source. When the controllable bidirectional AC switch is to be switched to the switch-on state, the processing unit outputs a trigger pulse to the controllable bidirectional AC switch after a delay time after the zero voltage crossing point, such that a phase difference between a back electromotive force and a current flowing through the stator winding is decreased.

According to another aspect, a motor is provided, which includes a stator, a permanent magnet rotor, and the above-described driving circuit.

According to still another aspect, a motor driving method is provided, which includes the following steps:

detecting a magnetic pole position of a permanent magnet rotor and a voltage polarity of an AC power source; and when a controllable bidirectional AC switch connected in series with a stator winding between two ends of the AC power source is to be turned on, based on the magnetic pole position of the rotor and the voltage polarity of the AC power source, outputting a trigger pulse to the controllable bidirectional AC switch after a delay time after a zero voltage crossing point of the AC power source, such that a phase difference between a back electromotive force and current flowing through the stator winding is decreased.

In the embodiments of the present disclosure, the controllable bidirectional AC switch is switched between a switch-on state and a switch-off state in a predetermined way, according to the magnetic pole position of the rotor and the voltage polarity of the AC power source. In addition, the controllable bidirectional AC switch is delayed to be turned on after the zero voltage crossing point. Accordingly, desired torque may be produced by the motor, power consumption due to negative torque acting against positive torque may be decreased, and the motor power efficiency may be improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
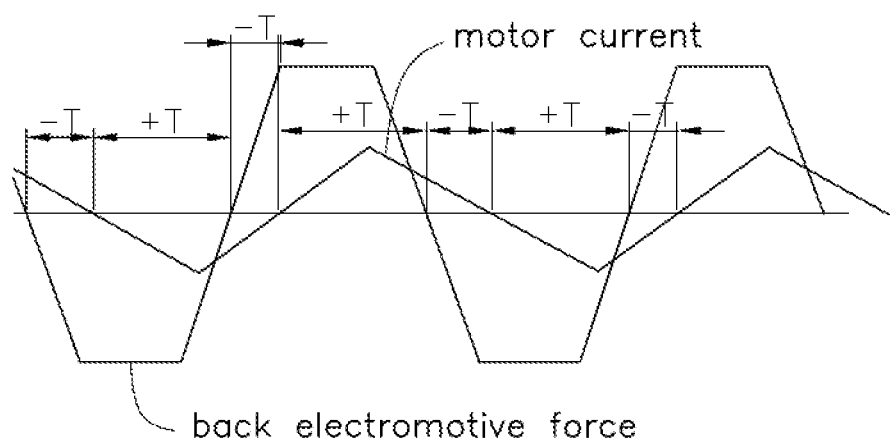
FIG. 1 is a prior art waveform showing the Bemf of a stator and motor current being out of phase.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 2:
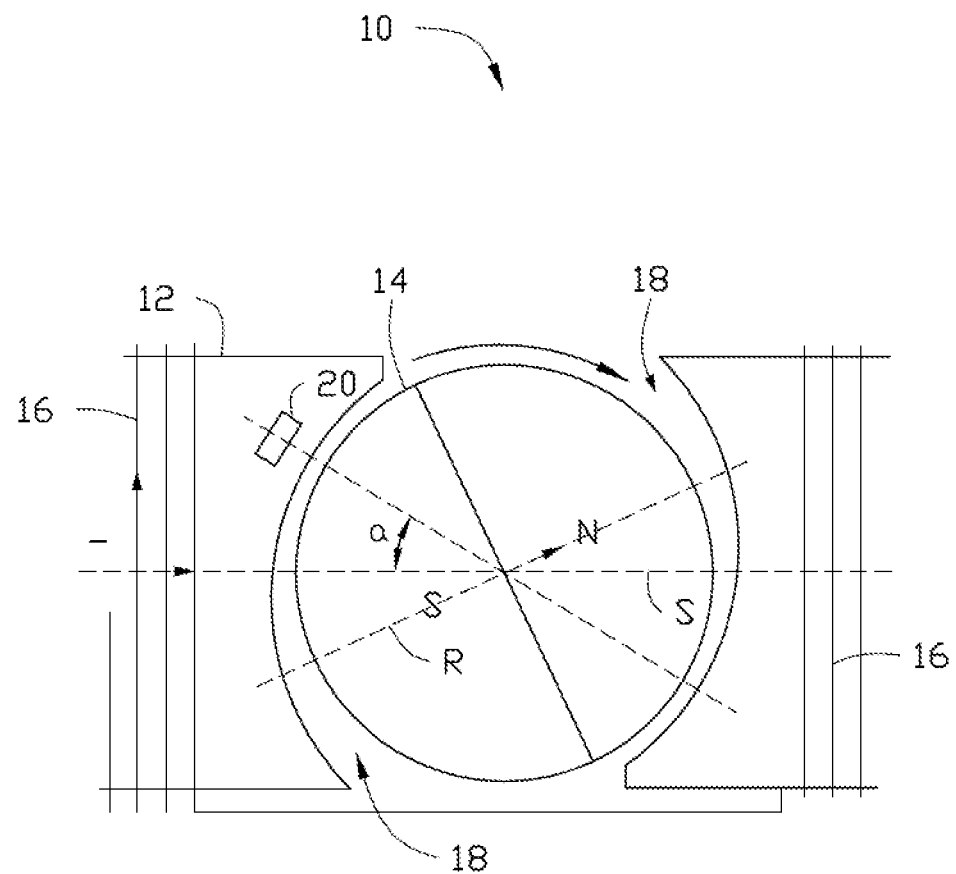
FIG. 2 is a diagrammatic representation of a motor according to a preferred exemplary embodiment of the present disclosure.

FIG. 2 schematically shows a motor 10 according to an embodiment of the present disclosure. The motor 10 takes a synchronous motor as an example. The motor 10 includes a stator and a permanent magnet rotor 14 rotatably disposed within magnetic poles of the stator, and the stator includes a stator core 12 and a stator winding 16 wound on the stator core 12. The rotor 14 is a permanent rotor.

Preferably, a non-uniform gap 18 is defined between the magnetic poles of the stator and permanent magnetic poles of the rotor 14 so that a polar axis R of the rotor 14 has an angular offset α relative to a central axis S of the stator when the rotor 14 is at rest. The rotor 14 may be configured to have a fixed starting position every time the stator winding 16 is energized. The polar axis R of the rotor 14 refers to a virtual connection line passing through two centers of two symmetrical magnetic poles (two pieces of magnets in this embodiment) along a diameter of the rotor 14. The central axis S of the stator refers to a virtual connection line passing through two centers of two symmetrical magnetic poles along a diameter of the stator. Each of the stator and the rotor has two magnetic poles as shown in FIG. 2. The non-uniform gap 18 gradually decreases along a starting direction of the rotor. In another embodiment, pole arc surface of the stator poles are concentric with the rotor thus forming a uniform main air gap. The pole arc surface defines an inwardly-recessed startup groove, such that a non-uniform air gap is defined between the startup groove and an outer surface of the rotor 14. It can be understood that, in other embodiments, the stator and the rotor may also have more than two magnetic poles, such as 4 or 6 magnetic poles.

In the embodiment, a position sensor 20 for detecting a magnetic pole position of the rotor is disposed on the stator or at a position near the rotor 14 inside the stator. The position sensor 20 has an angular offset relative to the central axis S of the stator. In this embodiment, the angular offset is preferably also α.

Figure 3:
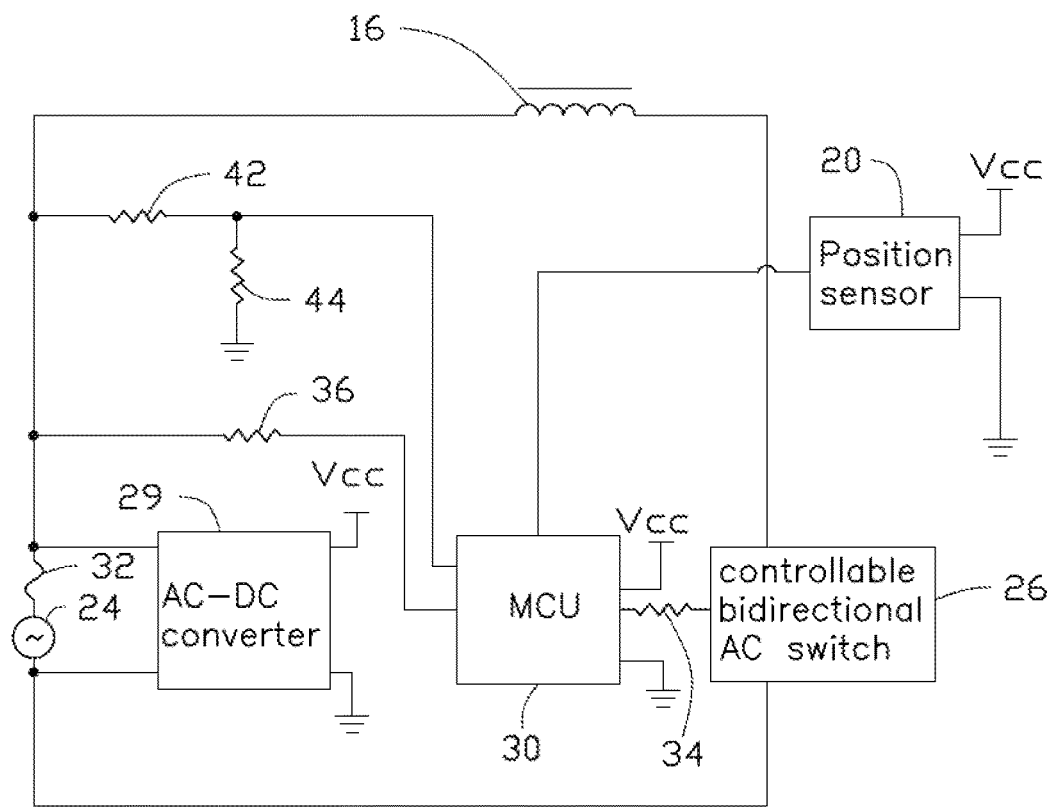
FIG. 3 is a block diagram of a motor driving circuit according to a first embodiment of the present disclosure.

FIG. 3 shows a block diagram of a motor driving circuit according to a first embodiment of the present disclosure. In the embodiment, the motor driving circuit includes a controllable bidirectional AC switch 26, a microcontroller unit (MCU) 30, the position sensor 20, an AC-DC converter 29, and a fuse 32. The controllable bidirectional AC switch 26, the stator winding 26 and the fuse 32 are connected in series between two ends of an AC power source 24. The AC power source 24 may be a commercial AC power supply, for example, 220V or 230V, or an AC power supply output from an inverter.

Preferably, the controllable bidirectional AC switch is a TRIAC. It can be understood, the controllable bidirectional AC switch is not limited to being the TRIAC, for example, it can be realized by two silicon-controlled rectifiers (SCRs) connected inversely in parallel.

The AC-DC converter 29 is connected between a first end and a second end of the AC power source 24 via the fuse 32. The MCU 30 is connected to a DC power supply terminal Vcc, the voltage of the DC power supply terminal Vcc can be obtained by converting the AC voltage from the AC power source 24 into a low DC voltage by the AC-DC converter 29. The position sensor 20 is also connected to the DC power supply terminal Vcc and receives a working voltage. The position sensor 20 is configured for detecting the magnetic pole position of the rotor 14 of the motor 10 and outputting a corresponding magnetic pole position signal to the MCU 30. It can be understood that, the voltage provided to the MCU 30 and the voltage provided to the position sensor 20 may be the same or not the same, for example, the voltage provided to the MCU 30 may be 3.3V, and the voltage provided to the position sensor 20 may be 5V or 12V.

Figure 4:
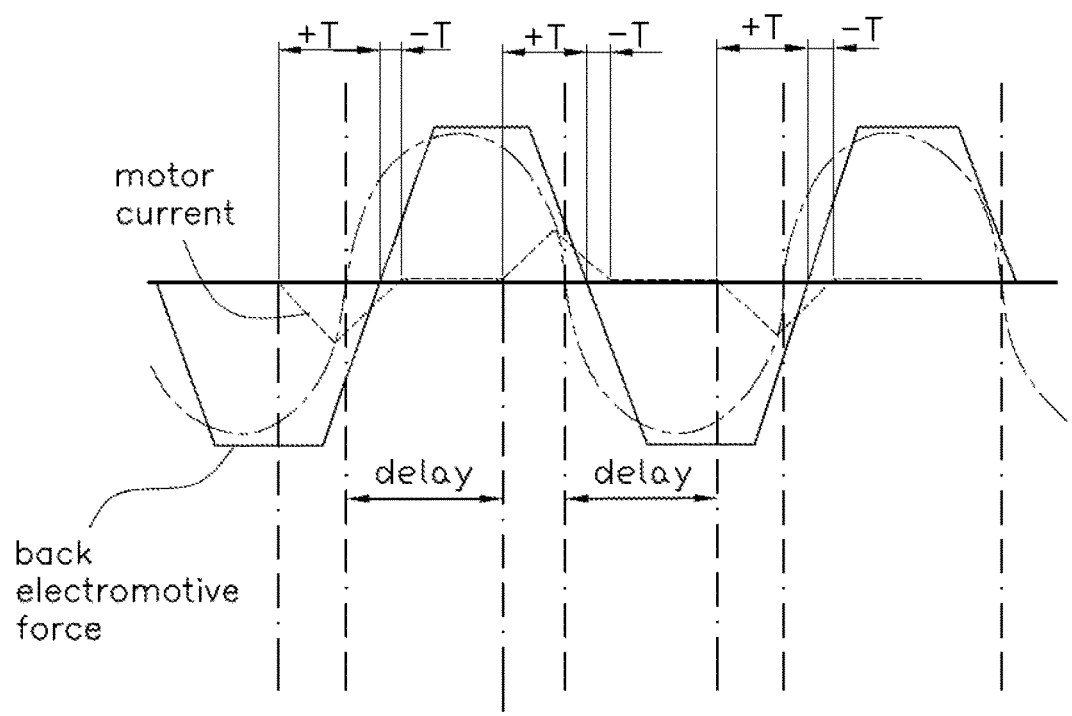
FIG. 4 is a waveform showing the Bemf of a stator and motor current according to embodiments of the present disclosure.

The MCU 30 obtains the magnetic pole position signal from the position sensor 20. The MCU 30 is connected to a control electrode of the controllable bidirectional AC switch 26 via a resistor 34. A zero crossing detection end of the MCU 30 is connected to the first end of the AC power source 24 via a resistor 36 for detecting a zero voltage crossing point of the AC power source. The resistor 36 is a resistor with megaohm values. A voltage polarity detection end of the MCU 30 is connected to the first end of the AC power source 24 via a resistor 42 for detecting the voltage polarity of the AC power source 24 and the voltage value of the AC power source, and is grounded via a resistor 44. In other embodiments, the zero crossing detection end may be directly connected to the first end of the AC power source 24 without the resistor 36. The MCU 30 may not include the zero crossing detection end, and the voltage polarity detection end also act as the zero crossing detection end. Each of the zero crossing detection end and voltage polarity detection end of the MCU 30 may include a voltage clamping circuit. The MCU 30 may include a waveform conversion unit (not shown), for reducing and offsetting the amplitude voltage of the AC power source in a certain percentage into a sine wave with a voltage between 0~Vcc (a DC voltage). If the converted voltage value is greater than Vcc/2, the polarity of the AC power source is deemed as positive, if the converted voltage value is less than Vcc/2, the polarity of the AC power source is deemed as negative. The MCU 30 is configured to detect the zero voltage crossing point and voltage polarity of the AC power source 24, control the controllable bidirectional AC switch 26 to be switched between a switch-on state and a switch-off state in a predetermined way, based on the magnetic pole position of the rotor 14 and the voltage polarity of the AC power source 24. When the controllable bidirectional AC switch 26 is to be switched to the switch-on state based on the magnetic pole position of the rotor and the voltage polarity of the AC power source, the MCU outputs a trigger pulse to the controllable bidirectional AC switch after a delay time after the zero voltage crossing point, such that a phase difference between back electromotive force (Bemf) and motor current is decreased. Preferably, the delay time is a pre-set time. Referring to FIG. 4, the controllable bidirectional AC switch 26 is delayed to be turned on ("delay" shown in FIG. 4) after the zero voltage crossing point, and the phase difference between the Bemf and motor current is greatly reduced. When compared with FIG. 1, it can be seen from FIG. 4, the negative torque (−T) is greatly reduced.

The delay time may be determined based on at least one parameter selected from the group consisting of voltage value of the AC power source 24, frequency of the AC power source 24, inductance value of the stator winding 16, internal resistance of the stator winding 16, temperature of the motor, temperature of environment surrounding the motor, and temperature of the MCU. Preferably, the greater the voltage value of the AC power source 24, the longer the delay time. In some embodiments, establishing a plurality of voltage ranges, different voltage ranges correspond to different delay times.

Preferably, the lower the frequency of the AC power source 24, the longer the delay time. In some embodiments, establishing a plurality of frequency ranges, different frequency ranges correspond to different delay times.

Preferably, the smaller the inductance value of the stator winding 16, the longer the delay time. In some embodiments, establishing a plurality of inductance value ranges, different inductance value ranges correspond to delay times. Preferably, the smaller the internal resistance of the stator winding 16, the longer the delay time.

When the delay time is determined based on the internal resistance of the stator winding 16, a temperature sensor (not shown) is preferably included in the motor driving circuit to detect the temperature of the motor or the temperature of environment surrounding the motor. Because the temperature will rise after the motor works, parameters such as internal resistance, inductance value, and magnetic induction intensity will change with the temperature. The changing degree of the internal resistance of the stator winding 16 with the temperature is greater than the changing degree of the inductance value. For example, when the temperature rises, the internal resistance and inductance value increase, but the magnetic induction intensity decreases. When the temperature decreases, the internal resistance and inductance value decrease, but the magnetic induction intensity increases. Changes of these parameters, such as internal resistance, inductance, and magnetic induction intensity, will eventually lead to the phase difference between the stator winding current and back electromotive force of the stator winding increasing or decreasing. Therefore, the temperature sensor is preferably included in the motor driving circuit to detect the temperature of the motor or the temperature of environment surrounding the motor, and the delay time is preferably changed with the temperature. As these parameters (e.g., internal resistance and inductance value) changing with temperature may have inverse impact on the phase difference between the stator winding current and Bemf of the stator winding, the relationship between the delay time and the detected temperature will be set up according to actual situation. For example, the lower the temperature, the longer the delay time. In some embodiments, establishing a plurality of temperature ranges, different temperature ranges correspond to different delay times.

In an alternate embodiment, the temperature sensor may be integrated within the MCU for detecting the temperature of the MCU. In some embodiments, the lower the temperature of the MCU, the longer the delay time.

In some embodiments, the MCU 30 stores a lookup table including a plurality of parameters about the voltage value of the AC power source, frequency of the AC power source, inductance value of the stator winding, and temperature of the motor (temperature of environment surrounding the motor, or temperature of the MCU) and the corresponding delay time (see table 1). The MCU 30 real-time detects the voltage value and the frequency of the AC power source 24, and real-time obtains temperature of the motor, environment surrounding the motor, or the MCU. The inductance value of the stator winding 16 can be pre-stored in the MCU. The MCU 30 finds out the delay time from the lookup table based on the parameters.

TABLE 1

| lookup table of the delay time | | | | |
|---|---|---|---|---|
| voltage value of the AC power source (input) | frequency of the AC power source | temperature | inductance value of the stator winding | delay time |
| 110 V > input > 96 V | 50 Hz | 40°-60° | 30-40 mH | D1 |
| ... | ... | ... | ... | ... |

In some embodiments, the delay time may be replaced with other parameters, such as firing angle, which is also capable of represent a delay. The delay time can be determined based on at least one of the parameters consisting of voltage value of the AC power source, frequency of the AC power source, inductance value of the stator winding, internal resistance of the stator winding, temperature of the motor, temperature of environment surrounding the motor, and temperature of the MCU. Each parameter may further be divided into several ranges, the delay time is determined according to the range in which the parameter is located.

In the embodiment shown in FIG. 3, the MCU 30 is configured to detect the voltage value, zero voltage crossing point, voltage polarity of the AC power source 24. The controllable bidirectional AC switch 26 is switched between the switch-on state and the switch-off state in a predetermined way, based on the delay time or the firing angle corresponding to the voltage value of the AC power source, the zero voltage crossing point, the voltage polarity of the AC power source, and the magnetic pole position of the rotor 14. The purpose of the motor being controlled in such manner is simply to produce the expected torque during operation as far as possible and improve the motor efficiency significantly.

Figure 5:
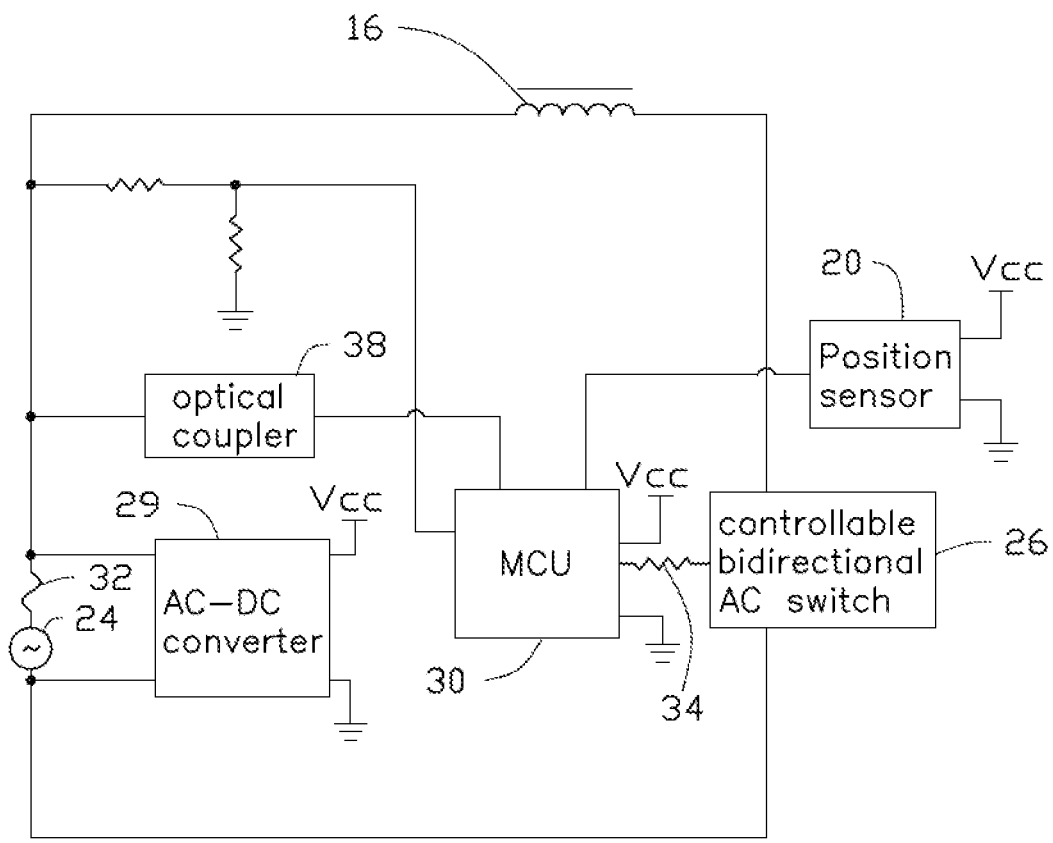
FIG. 5 is a block diagram of a motor driving circuit according to a second embodiment of the present disclosure.

Referring to FIG. 5, a block diagram of a motor driving circuit is shown, according to a second embodiment of the present disclosure. Compared to the first embodiment, the zero crossing detection end of the MCU 30 detects the zero voltage crossing point of the AC power source through an optical coupler 38. It can be understood that, the MCU 30 also can obtain the information of the AC power source 24 through an electric-field coupling way (such as transformer coupling). When the optical coupler or the electric-field coupling is adopted, there is no need to include the clamping circuit at the zero crossing detection end of the MCU 30.

Although in the embodiment the MCU 30 acts as a processing unit, it can be understood that, the MCU 30 can be replaced by any suitable electrical or semiconductor devices which can execute the above operations. That is, the processing unit can control the controllable bidirectional AC switch to be switched between the switch-on state and the switch-off state, based on the voltage value of the AC power source, the magnetic pole position of the permanent magnet rotor, such that the motor is controlled to only produce the expected torque. For example, the processing unit may be ASIC, which is customized to the customer's needs, and further include the function of the Hall sensor. The ASIC has small volume, fast processing speed, and low manufacturing and support costs. The MCU can also be replaced by discrete components, such as programmable logic device (PLD) or programmable array logic (PAL).

Figure 6A:
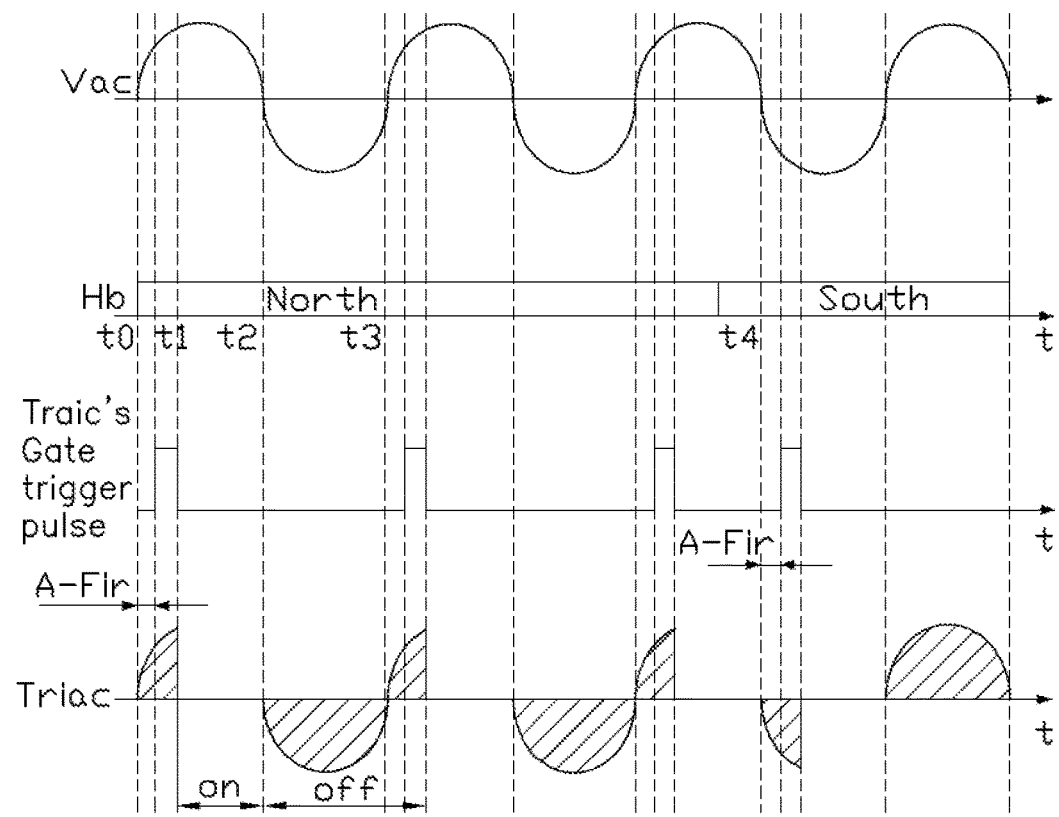
FIG. 6A is a waveform of the motor driving circuit of FIG. 3 when a load of the circuit is pure resistance load.

Referring to FIG. 6A, an operational principle of the motor driving circuit is illustrated. In FIG. 6A, Vac indicates a waveform of the voltage of the AC power source 24, Hb indicates a rotor magnetic field detected by the position sensor 20, and Triac's Gate trigger pulse indicates a trigger pulse provided to the control electrode of the controllable bidirectional AC switch 26. Triac indicates the state of the controllable bidirectional AC switch 26, on indicates the switch-on state, and off indicates the switch-off state.

The AC power source 24 can be an electrical resource extracted from the power grid, which is fluctuant. As a result, the voltage provided by the AC power source 24 is fluctuant. Moreover, different countries have different voltage standards, for example, some national standards are 220 volts, and some national standards are 110 volts. The values of these voltages and the occurrence of fluctuations will impact on the operation of the motor. The AC power provided by the inverter may also be fluctuant. In this embodiment, the MCU 30 stores a lookup table including amplitudes or effective values of the AC power source and the corresponding firing angles (see table 2). The MCU 30 real-time detects the current voltage value of the AC power source 24, and calculates the amplitude or effective voltage of the AC power source based on the current voltage value and an angle corresponding to the current voltage value (the angle here refers to an angle from 0 to 360 degrees per cycle of the AC power source, for example, 90 degrees corresponds to the voltage amplitude). The MCU 30 further finds the corresponding firing angle from the lookup table according to the amplitude or the effective voltage value of the AC power source 24. Specifically, in the embodiment, the amplitude of the AC power source 24 is divided into a plurality of amplitude ranges, each of which corresponds to a firing angle. The MCU 30 determines which amplitude range the detected voltage value of the AC power source located in, and finds the corresponding firing angle according to the lookup table. In other embodiments, the MCU 30 may store a lookup table including some voltages at a predetermined angle (e.g., 30 degrees, 60 degrees, etc., from 0 to 360 degrees) and the corresponding firing angles. The MCU 30 instantly detects the voltage value of the AC power source 24 at the predetermined angle, and finds the corresponding firing angle from the lookup table based on the detected voltage value.

TABLE 2

| lookup table including amplitudes of the AC power source and the corresponding firing angles | |
|---|---|
| amplitude of the AC power source input (Volts) | firing angle |
| 110 V > input > 96 V | AA |
| 120 V > input > 110 V | BB |
| ... | ... |
| 276 V > input > 230 V | XX |

In an alternative embodiment, the MCU 30 may store the delay time corresponding to the voltage of the AC power source 24 instead of storing the firing angle, and the delay time may be calculated based on the firing angle and the frequency of the AC power source.

In this embodiment, the firing angle or delay time is determined depending on the voltage value of the AC power source 24. The motor 10 can thus achieve a better power control in response to power grid voltage fluctuations and different national voltage standards.

The MCU 30 may also real-time detects the zero voltage crossing point of the AC power source 24, and determines whether the voltage polarity of the AC power source 24 changes from positive to negative, or from negative to positive. That is, when the zero voltage crossing point of the AC power source 24 is detected, the MCU 30 further determines the voltage polarity of the AC power source 24 following the zero voltage crossing point.

Figure 7:
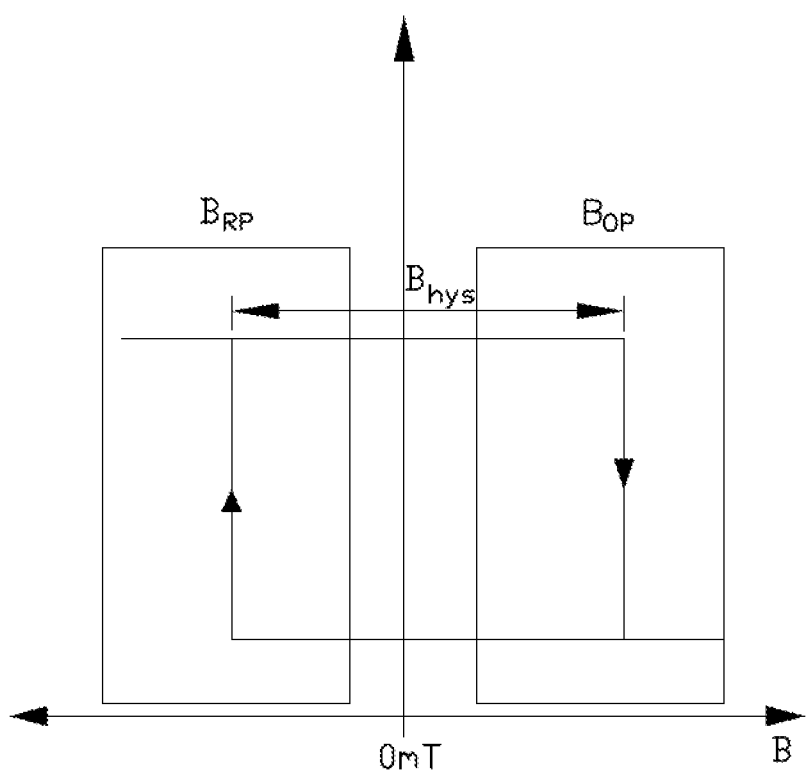
FIG. 7 is a schematic diagram of a first embodiment of a switch type Hall sensor.
Figure 8:
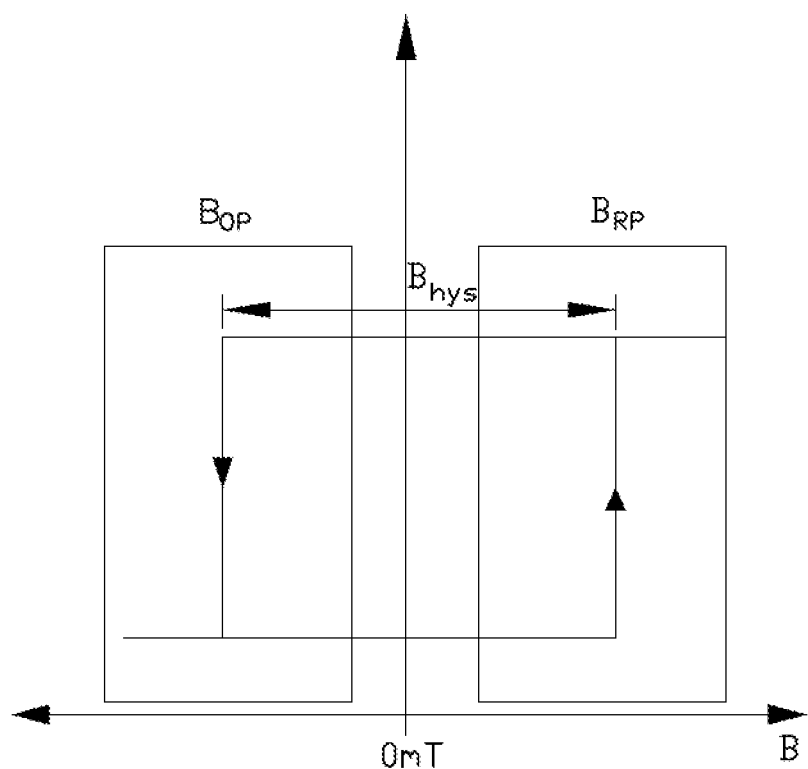
FIG. 8 is a schematic diagram of a second embodiment of the switch type Hall sensor.

The position sensor 20 real-time detects the magnetic pole position of the rotor and transmit the corresponding magnetic pole position signal to the MCU 30. In the embodiment, the position sensor 20 is preferably a switch type Hall sensor. FIG. 7 shows a magnetoelectric conversion characteristic of the switch type Hall sensor. When an applied magnetic flux density exceeds the operating point BOP, the switch type Hall sensor will output a low level voltage and maintain the low level voltage until the magnetic flux density decreases to the release point BRP, and then output a high level voltage. The interval Bhys between BOP and BRP makes the switch type Hall sensor switch more reliable. In the embodiment, in the case that the position sensor 20 is powered normally, the position sensor 20 outputs a logic high level when the detected rotor magnetic field is North, and outputs a logic low level when the detected rotor magnetic field is South. It should be understood that, in other embodiments, the position sensor 20 may also be a linear Hall sensor or an optoelectronic encoder, and one skilled in the art will appreciate that the magnetic pole position of the rotor may also be determined by a non-angular sensor method such as the Bemf zero crossing method. In other embodiments, the position sensor 20 may also be a switch type Hall sensor having opposite output states to those of the Hall sensor shown in FIG. 7, as is shown in FIG. 8.

After detecting the zero voltage crossing point of the AC power source 24, the MCU 30 determines whether or not to turn on the controllable bidirectional AC switch 26 according to the voltage polarity of the AC power source and the magnetic pole position of the rotor. In some embodiments, only when the detected rotor magnetic field is North and the polarity of the AC power source is positive, or the detected rotor magnetic field is South and the polarity of the AC power source is negative, does the MCU 30 outputs the trigger pulse to the controllable bidirectional AC switch 26 after a predetermined firing angle corresponding to the voltage value of the AC power source. When the detected rotor magnetic field is North and the polarity of the AC power source is negative, or the detected rotor magnetic field is South and the polarity of the AC power source is positive, the MCU 30 does not output a trigger pulse to the control electrode of the controllable bidirectional AC switch 26.

Figure 6B:
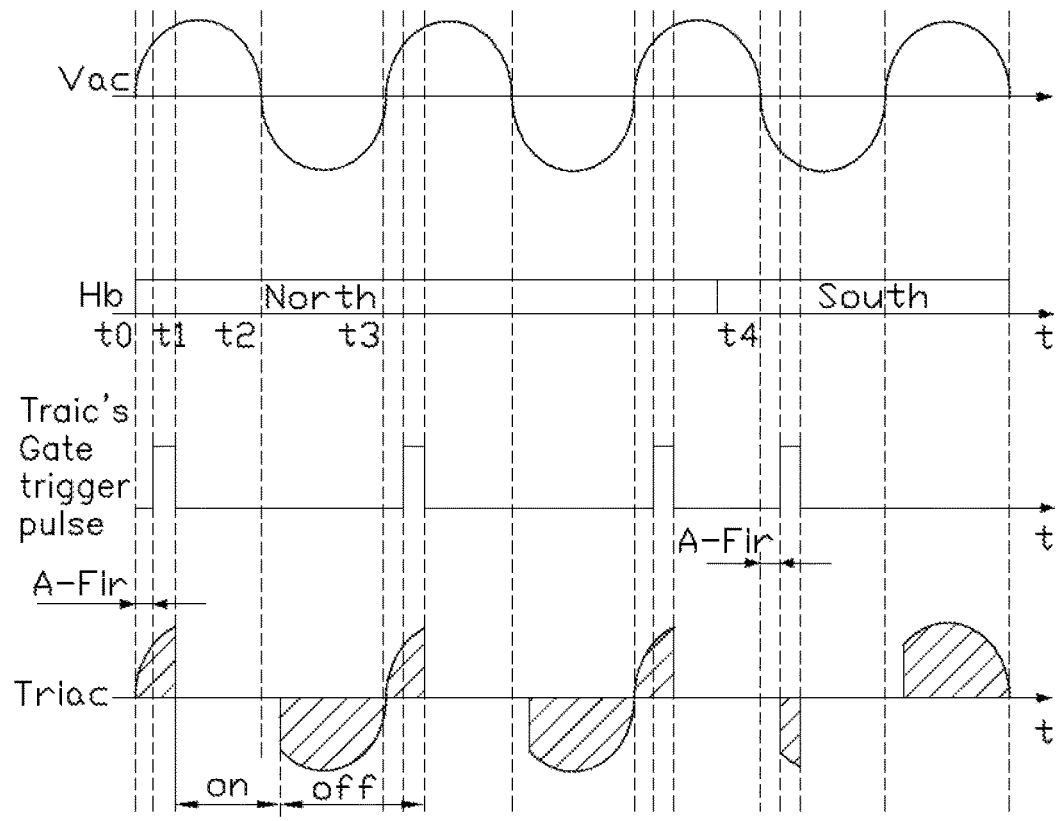
FIG. 6B is a waveform of the motor driving circuit of FIG. 3 when a load of the circuit for driving a motor is pure inductive load.

Referring to FIG. 6A, the time instant t0 is one of the zero voltage crossing points of the AC power source. The rotor magnetic field detected by the position sensor 20 is North at the time instant t0. The voltage polarity of the AC power source following the time instant t0 is positive. Thus, the MCU 30 outputs the trigger pulse to the controllable bidirectional AC switch 26 at the time instant t1 to turn on the controllable bidirectional AC switch 26. The firing angle is shown as A-Fir in FIG. 6A. The controllable bidirectional AC switch 26 is turned on after the trigger pulse. Preferably, if a pulse width of the trigger pulse does not reach a scheduled length, or an amplitude of the trigger pulse does not reach a trigger current, the controllable bidirectional AC switch 26 will not be activated. After the controllable bidirectional AC switch 26 is turned on, current flowing through the stator winding 16 induces Bemf in the stator winding 16 to produce the expected torque and drive the rotor 14 to rotate in a predetermined direction, such as clockwise. At the time instant t2 (a next zero voltage crossing point of the AC power source), the rotor magnetic field detected by the position sensor 20 is still North. The voltage polarity of the AC power source following the time instant t2 is negative. Thus, the MCU 30 does not act. As a result, the MCU 30 does not output a trigger pulse to the controllable bidirectional AC switch 26. The controllable bidirectional AC switch 26 will automatic shut off when the current flowing through the controllable bidirectional AC switch 26 is close to zero. In fact, when the motor has a very small inductance, like a pure resistance load, the current from the AC power source 24 is close to 0 ampere at the zero voltage crossing point of the AC power source 24, which is less than a holding current threshold of the controllable bidirectional AC switch. The controllable bidirectional AC switch 26 is thus turned off. In other embodiments, if the motor has a high inductive load, the time instant when the current is close to 0 ampere occurs at a moment later than the zero voltage crossing point of the AC power source 24. Referring to FIG. 6B, the controllable bidirectional AC switch 26 is turned off at the moment later than the time instant t2. The current flowing through the stator winding 16 is very small (since the reactive energy stored in the stator winding 16 is very small) and generates very small driving force for the rotor 14, therefore, the rotor 14 continues to rotate clockwise due to inertia. At the time instant t3 (a next zero voltage crossing point of the AC power source), the rotor magnetic field detected by the position sensor 20 is still North. The voltage polarity of the AC power source following the time instant t3 is positive. Thus, the operation of the MCU 30 is similar to that at the time instant t0, there is no need to repeat the description.

At the time instant t4 (a next zero voltage crossing point of the AC power source), the rotor magnetic field detected by the position sensor 20 is South. The voltage polarity of the AC power source following the time instant t4 is negative, the MCU 30 may output the trigger pulse to the controllable bidirectional AC switch 26 according to the firing angle determined in the lookup table shown in Table 1. The subsequent operation of the MCU 30 is similar to that of the same condition as described above, and there is no need to repeat. The control method of the MCU 30 throughout the above procedure is described in Table 3.

TABLE 3

Control method of the MCU

| voltage polarity of the AC power source | detected rotor magnetic field | MCU's operation |
|---|---|---|
| positive | North | output trigger pulse to the controllable bidirectional AC switch |
| negative | North | No action (does not output trigger pulse to the controllable bidirectional AC switch) |
| negative | South | output trigger pulse to the controllable bidirectional AC switch |
| positive | South | No action (does not output trigger pulse to the controllable bidirectional AC switch) |

In other embodiments, as shown in FIG. 8, a switch type Hall sensor having an opposite output state to the Hall sensor shown in FIG. 7 is employed. The method in which the MCU 30 controls the controllable bidirectional AC switch to be switched between a switch-on state and a switch-off state can be adjusted accordingly. For example, when the detected rotor magnetic field is South and the polarity of the AC power source is positive, or the detected rotor magnetic field is North and the polarity of the AC power source is negative, the MCU 30 outputs the trigger pulse to the controllable bidirectional AC switch 26 after a predetermined firing angle. When the detected rotor magnetic field is South and the polarity of the AC power source is negative, or the detected rotor magnetic field is North and the polarity of the AC power source is positive, the MCU 30 does not output a trigger pulse to the control electrode of the controllable bidirectional AC switch 26.

In some embodiments, in addition to detecting the zero voltage crossing point of the AC power source, the MCU 30 further determines the zero voltage crossing point as the point at which a voltage of the AC power source changes from positive to negative or from negative to positive. If the zero voltage crossing point is a point at which a voltage of the AC power source changes from positive to negative, the MCU 30 further determines whether the detected rotor magnetic field is South or not. When the detected rotor magnetic field is South, the MCU 30 outputs the trigger pulse to the controllable bidirectional AC switch 26 when the firing angle has been reached after the zero voltage crossing point of the AC power source. If the zero voltage crossing point is a point at which a voltage of the AC power source changes from negative to positive, the MCU 30 further determines whether the detected rotor magnetic field is North or not. When the detected rotor magnetic field is North, the MCU 30 outputs the trigger pulse to the controllable bidirectional AC switch 26 when the firing angle has been reached after the zero voltage crossing point of the AC power source. If the above situations do not occur, the MCU 30 does not output a trigger pulse to the controllable bidirectional AC switch 26, and the controllable bidirectional AC switch 26 will automatic shut off when the operating current flowing through the controllable bidirectional AC switch 26 approaches zero.

In some embodiments, the way in which the MCU 30 controls the controllable bidirectional AC switch to be switched between a switch-on state and a switch-off state can be adjusted accordingly. If the zero voltage crossing point is a point at which a voltage of the AC power source changes from positive to negative, the MCU 30 further determines whether the detected rotor magnetic field is North or not. When the detected rotor magnetic field is North, the MCU 30 outputs the trigger pulse to the controllable bidirectional AC switch 26 when the firing angle has been reached after the zero voltage crossing point of the AC power source. If the zero voltage crossing point is a point at which a voltage of the AC power source changes from negative to positive, the MCU 30 further determines whether the detected rotor magnetic field is South or not. When the detected rotor magnetic field is South, the MCU 30 outputs the trigger pulse to the controllable bidirectional AC switch 26 when the firing angle has been reached after the zero voltage crossing point of the AC power source. If the above situations do not occur, the MCU 30 does not output a trigger pulse to the controllable bidirectional AC switch 26, and the controllable bidirectional AC switch 26 will automatic shut off when the operating current flowing through the controllable bidirectional AC switch 26 approaches zero.

Figure 9:
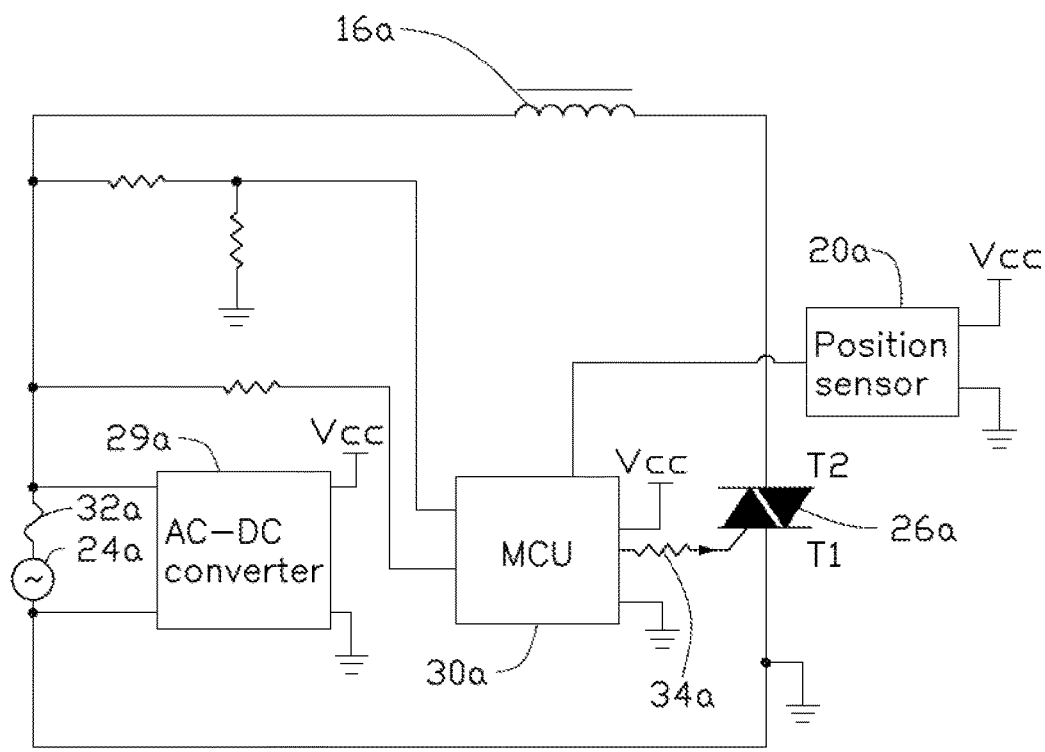
FIG. 9 is a block diagram of a motor driving circuit according to a third embodiment of the present disclosure.

FIG. 9 is a block diagram of a motor driving circuit according to a third embodiment of the present disclosure. In the embodiment, the motor driving circuit includes a TRIAC 26*a*, an MCU 30*a*, a position sensor 20*a*, an AC-DC converter 29*a*, and a fuse 32*a*. A first end of an AC power source 24*a* is connected to a second anode T2 of the TRIAC 26*a* via the fuse 32*a* and a stator winding 16*a*. A first anode T1 of the TRIAC 26*a* is connected to a second end of the AC power source 24*a*, and also grounded. The AC-DC converter 29*a* is connected between the first end and the second end of the AC power source 24 via the fuse 32*a*, configured to convert the alternating current into a low direct current voltage and output the same through a power supply terminal Vcc. The position sensor 20*a*, MCU 30*a* are connected to the power supply terminal Vcc to receive an operating voltage. The MCU 30*a* obtains a signal representing the magnetic pole position of the rotor output from the position sensor 20*a* and is connected to a control electrode of the TRIAC 26*a* via a resistor 34*a*.

Figure 10:
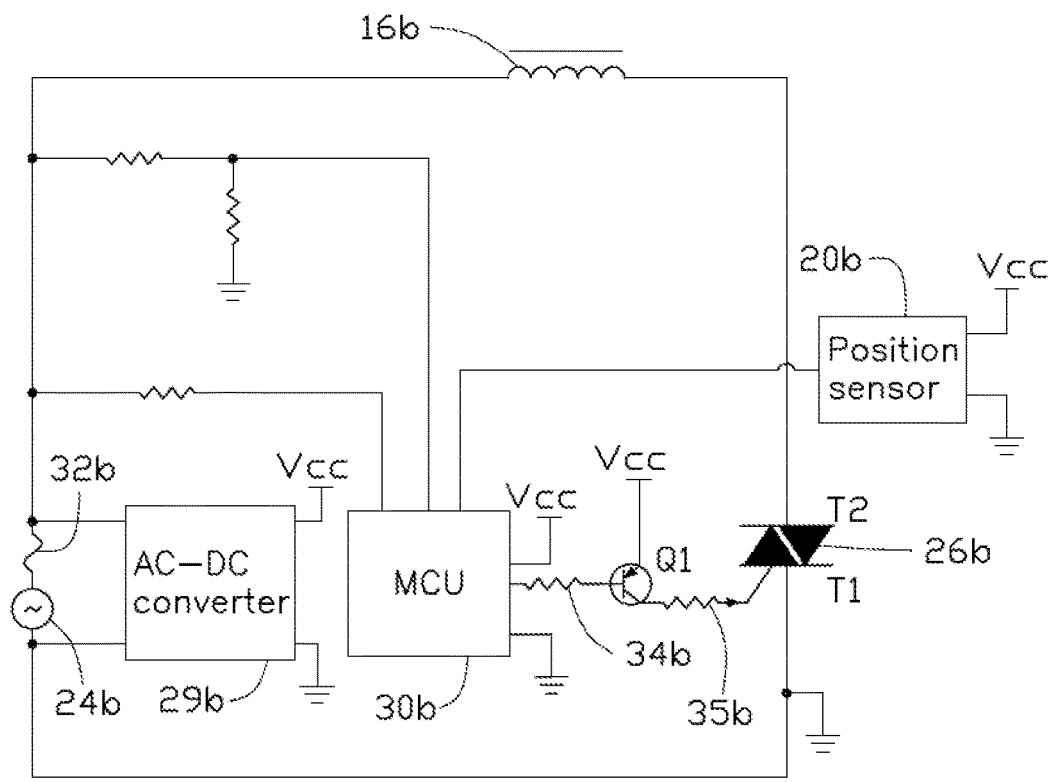
FIG. 10 is a block diagram of a motor driving circuit according to a fourth embodiment of the present disclosure.

FIG. 10 is a block diagram of a motor driving circuit according to a fourth embodiment of the present disclosure. In the embodiment, the motor driving circuit includes a TRIAC 26*b*, an MCU 30*b*, a position sensor 20*b*, an AC-DC converter 29*b*, and a fuse 32*b*, and a resistor 34*b*. The main difference between the fourth embodiment and the third embodiment is that, the motor driving circuit further includes a transistor Q1 and a resistor 35*b*, a base of the transistor Q1 is connected to the MCU 30*b* via the resistor 34*b*, an emitter of the transistor Q1 is connected to the power supply terminal Vcc, and a collector of the transistor Q1 is connected to the control electrode of the TRIAC 26*b* via a resistor 35*b*. In the embodiment, when a driving capability of the MCU 30*b* is insufficient to drive the TRIAC 26*b*, the transistor Q1 is connected between the MCU 30*b* and the control electrode of the TRIAC 26*b* to amplify a current to the control electrode of the TRIAC 26*b*.

Figure 11:
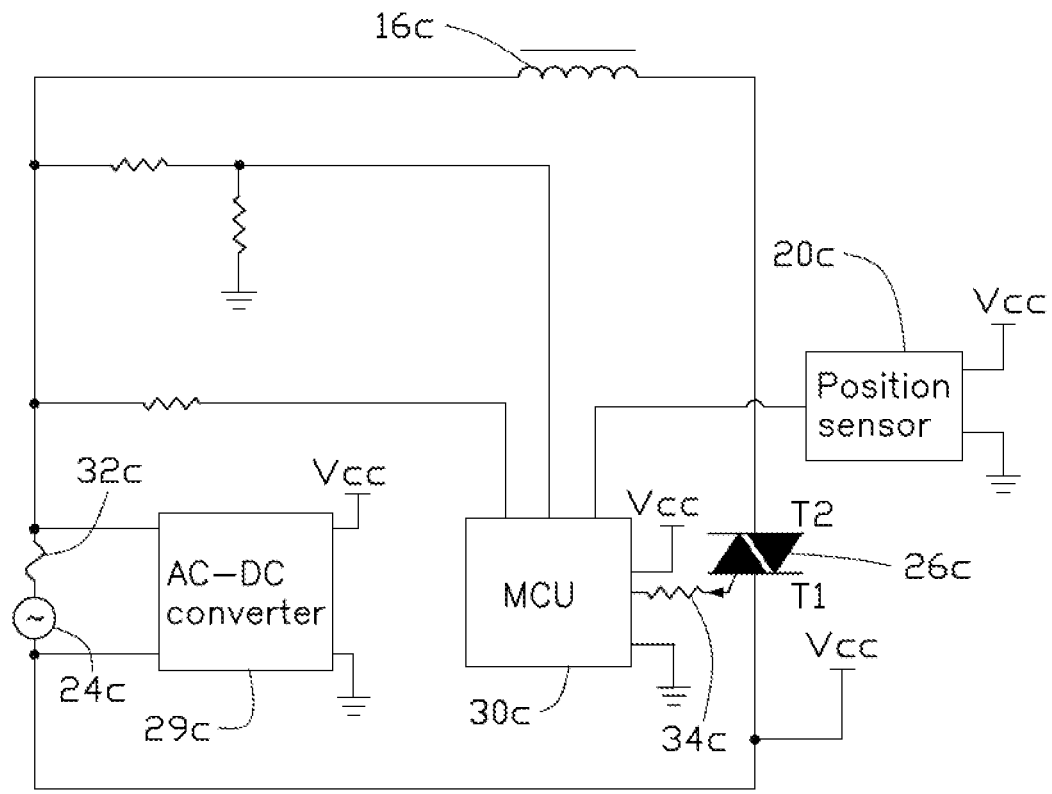
FIG. 11 is a block diagram of a motor driving circuit according to a fifth embodiment of the present disclosure.

FIG. 11 is a block diagram of a motor driving circuit according to a fifth embodiment of the present disclosure. In the embodiment, the motor driving circuit includes a TRIAC 26*c*, an MCU 30*c*, a position sensor 20*c*, an AC-DC converter 29*c*, and a fuse 32*c* and a resistor 34*c*. The main difference between the fifth embodiment and the third embodiment is that, the first anode T1 of the TRIAC 26*c* is connected to the power supply terminal Vcc, and the current flows from the control electrode of the TRIAC 26*c* to the MCU 30*c*.

Figure 12:
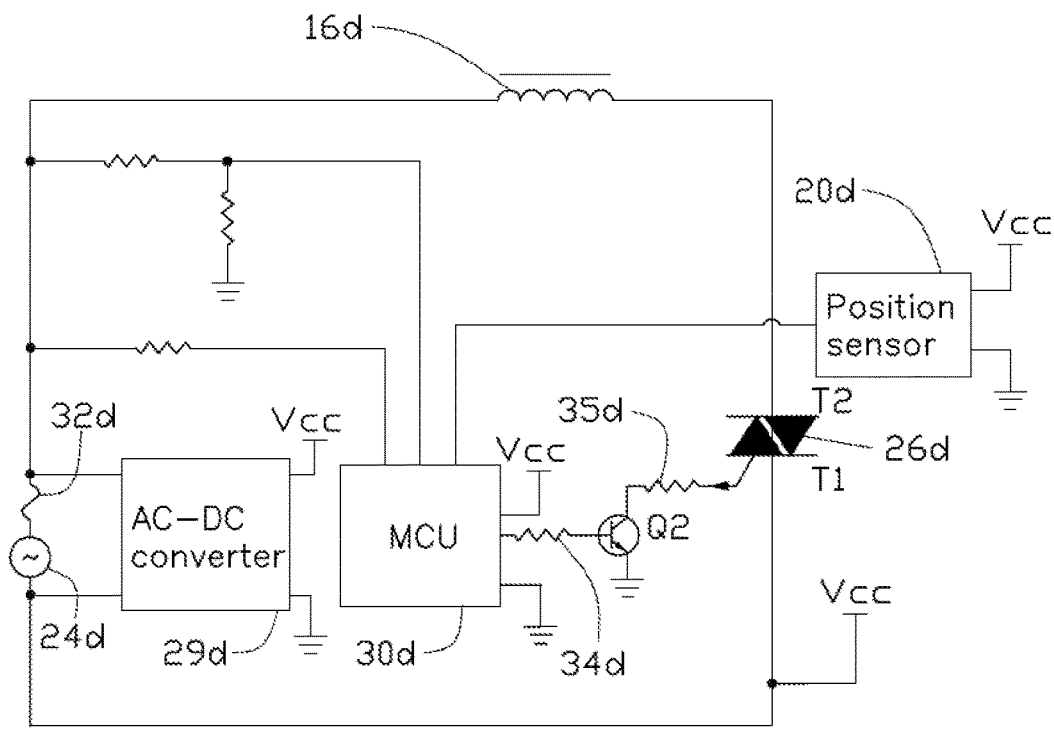
FIG. 12 is a block diagram of a motor driving circuit according to a sixth embodiment of the present disclosure.

FIG. 12 is a block diagram of a motor driving circuit according to a sixth embodiment of the present disclosure. In the embodiment, the motor driving circuit includes a TRIAC 26*d*, an MCU 30*d*, a position sensor 20*d*, a fuse 32*d*, and an AC-DC converter 29*d*. The main difference between the sixth embodiment and the fifth embodiment is that, the motor driving circuit further includes a transistor Q2 and a resistor 35*d*, a base of the transistor Q2 is connected to the MCU 30*d* via a resistor 34*d*, an emitter of the transistor Q2 is grounded, and a collector of the transistor Q2 is connected to the control electrode of the TRIAC 26*d* via the resistor 35*d*. In the embodiment, the transistor Q2 is connected between the MCU 30*d* and the control electrode of the TRIAC 26*d* to amplify a current to the control electrode of the TRIAC 26*d*.

The present disclosure also provides a motor driving method, the method comprising:

a. detecting an instant AC voltage polarity and zero voltage crossing point of the AC power source, and magnetic pole position of the rotor. When the voltage of the AC power source passes through zero voltage, the detected rotor magnetic field is North and the voltage polarity of the AC power source is positive, or when the voltage of the AC power source passes through zero voltage, the detected rotor magnetic field is South and the voltage polarity of the AC power source is negative, step b is implemented;

b. the MCU 30 outputs the trigger pulse to the controllable bidirectional AC switch 26 after a delay time after the zero voltage crossing point of the AC power source, then the process returns to the step a.

In other embodiment, the step a may also be "detecting an instant AC voltage polarity and zero voltage crossing point of the AC power source, and magnetic pole position of the rotor. When the voltage of the AC power source passes through zero voltage, the detected rotor magnetic field is South and the voltage polarity of the AC power source is positive, or when the voltage of the AC power source passes through zero voltage, the detected rotor magnetic field is North, and the voltage polarity of the AC power source is negative, step b is implemented".

In some embodiments, the step a may further include: the MCU determines the firing angle or the delay time according to at least one parameter selected from the group consisting of voltage value of the AC power source, frequency of the AC power source, inductance value of the stator winding, internal resistance of the stator winding, temperature of the motor, temperature of environment surrounding the motor, and temperature of the processing unit. Correspondingly, step b may be: the MCU 30 outputs the trigger pulse to the controllable bidirectional AC switch 26 after the firing angle or the delay time after the zero voltage crossing point, then the process returns to the step a.

Figure 13:
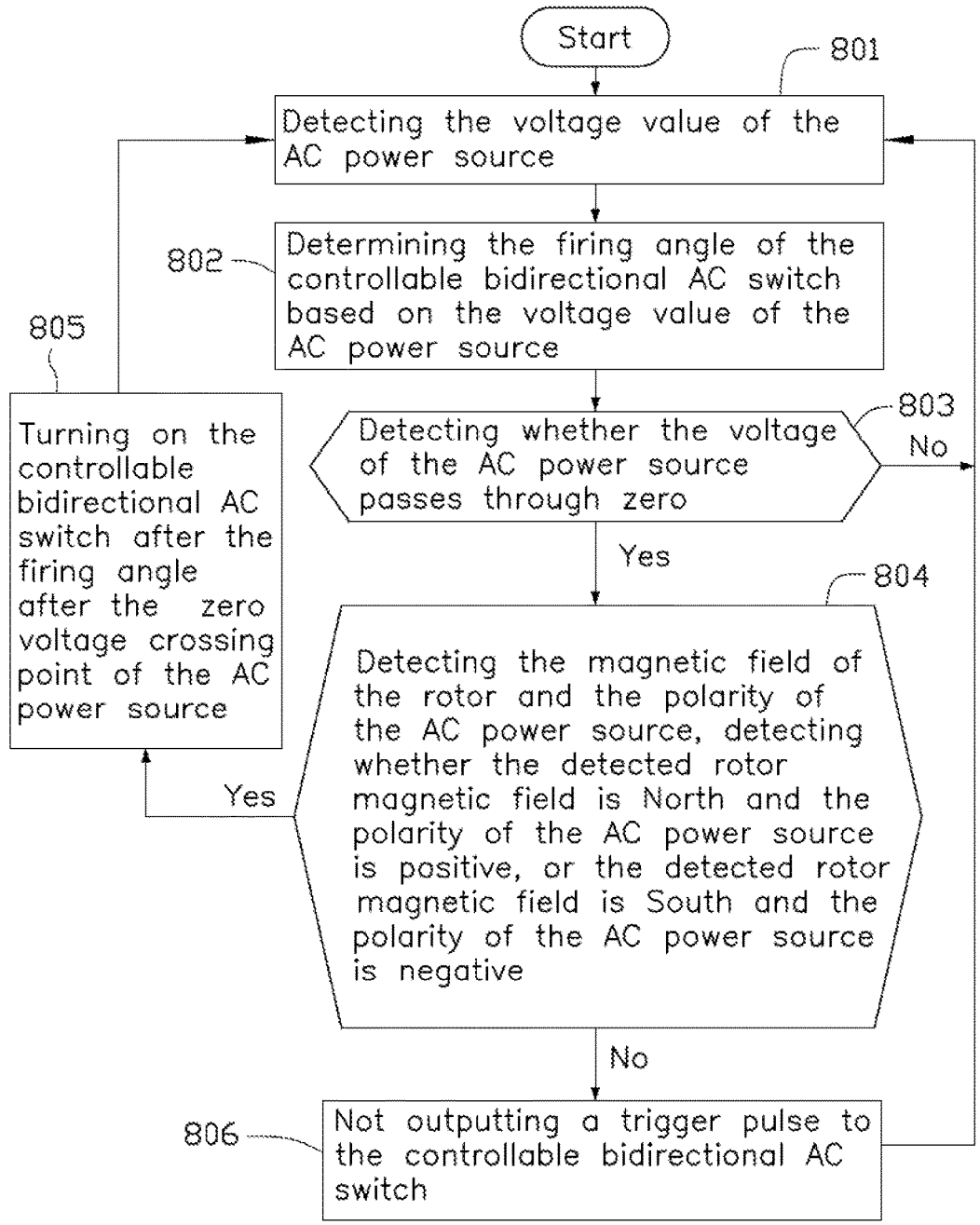
FIG. 13 is a flowchart of a motor driving method according to a first embodiment of the present disclosure.

A first embodiment of the motor driving method is shown in FIG. 13, the motor driving method includes:

Step 801: Detecting the voltage value of the AC power source.

Step 802: The MCU 30 determines the firing angle according to the voltage value of the AC power source 24. The MCU 30 may store a lookup table including the parameters about the voltage value of the AC power source and the corresponding firing angle. In the lookup table, there may be a plurality of voltage value ranges, each of which corresponds to a firing angle. The MCU 30 determines the voltage value range in which the detected voltage value of the AC power source is located and finds the corresponding firing angle according to the lookup table.

In the steps 801 and 802, the MCU may detect the voltage value of the AC power source 24 at a predetermined angle, and find the corresponding firing angle according to the detected voltage value. The MCU may also detect current voltage value and the corresponding angle thereof (the angle here refers to an angle from 0 to 360 degrees per cycle of the AC power source, for example, 90 degrees corresponds to the voltage amplitude), and calculate the amplitude or effective voltage of the AC power source. The MCU 30 also finds the firing angle from the lookup table according to the amplitude or the effective voltage value of the AC power source 24. The association between the voltage value of the AC power source and the firing angle is not limited to the above-described two ways.

Step 803: detecting whether the voltage of the AC power source passes through zero voltage, step 804 is implemented when the voltage of the AC power source passes through zero voltage, and step 801 is implemented when the voltage of the AC power source does not pass through zero voltage.

Step 804: detecting the magnetic field of the rotor and the polarity of the AC power source, step 805 is implemented if the detected rotor magnetic field is North and the polarity of the AC power source is positive, or the detected rotor magnetic field is South and the polarity of the AC power source is negative. Otherwise, step 806 is implemented.

Step 805: the MCU 30 outputs the trigger pulse to the controllable bidirectional AC switch 26 after the firing angle after the zero voltage crossing point of the AC power source, then the process returns to the step 801.

Step 806: the MCU 30 does not output the trigger pulse to the controllable bidirectional AC switch 26, the controllable bidirectional AC switch 26 will automatic shut off, then the process returns to the step 801.

It can be understood by those skilled in the art that, in the above steps, the firing angle can be replaced with the delay time. The firing angle or the delay time may be determined based on the voltage value of the AC power source 24. The firing angle or the delay time also may be determined based on at least one of the parameters including voltage value of the AC power source, frequency of the AC power source, inductance value of the stator winding, internal resistance of the stator winding, temperature of the motor, temperature of environment surrounding the motor, and temperature of the MCU. The operation of the MCU 30 also may be adjusted accordingly.

It can be noted that, the steps shown in FIG. 13 do not necessarily follow the order shown in the figure, some of the steps may be reversed, and two adjacent steps are not necessarily continuous. For example, the step 803 may be inserted between the step 801 and the step 802. The steps 803 and 804 may be implemented firstly, and the steps 801 and 802 may be implemented secondly. Referring to FIGS. 14 to 17, other embodiments of the motor driving method according to the present disclosure are shown, but these embodiments are merely illustrative and should not be construed as limiting the invention.

Figure 14:
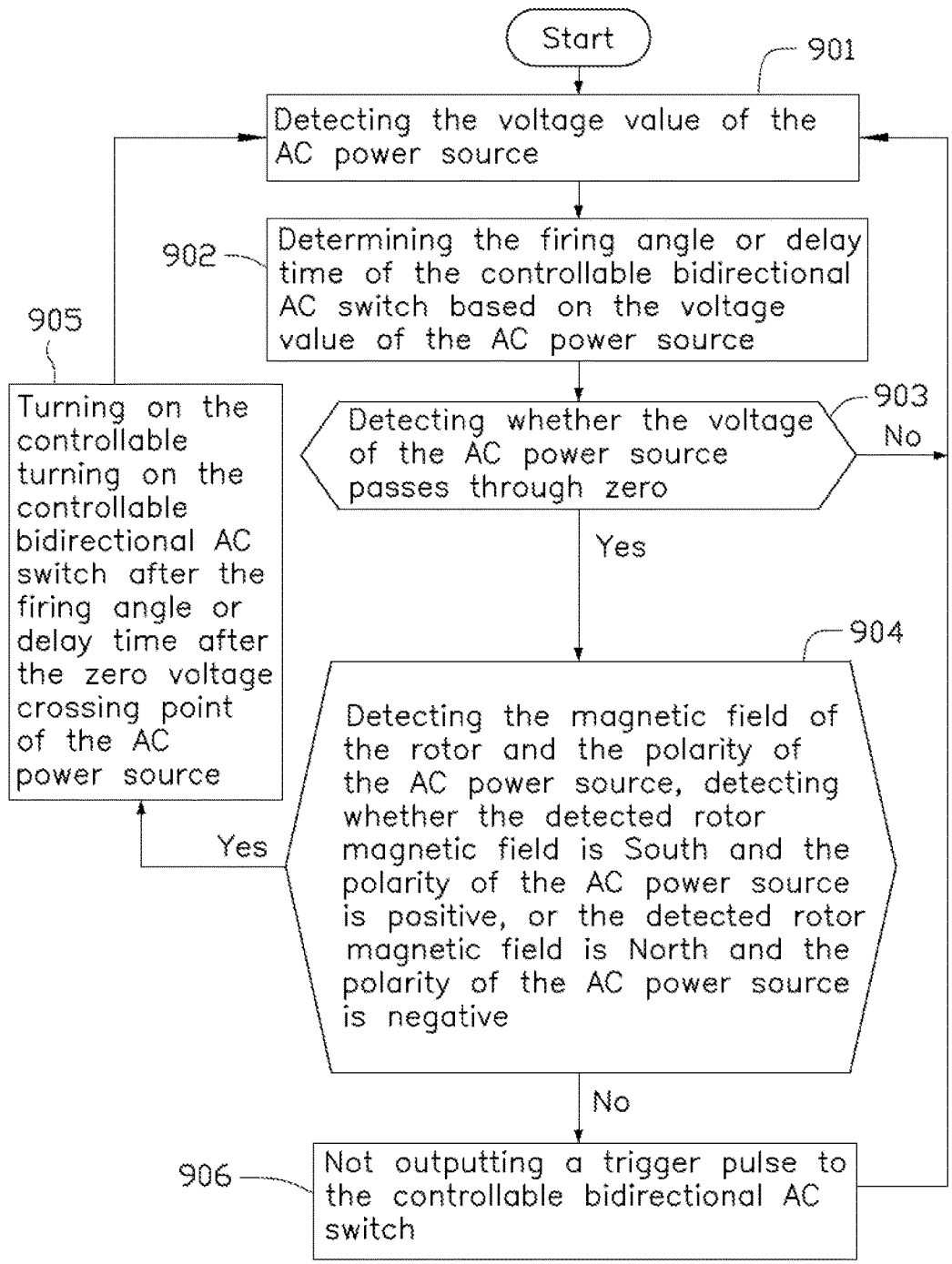
FIG. 14 is a flowchart of a motor driving method according to a second embodiment of the present disclosure.

FIG. 14 is a flowchart of a motor driving method according to a second embodiment of the present disclosure, and the motor driving method includes:

Step 901: Detecting the voltage value of the AC power source.

Step 902: The MCU 30 determines the firing angle or delay time based on the voltage value of the AC power source 24. The MCU 30 may store a lookup table including the parameters about the voltage value of the AC power source and the corresponding firing angle. In the lookup table, there are a plurality of voltage value ranges, each of which corresponds to a firing angle. The MCU 30 determines the voltage value range in which the voltage value of the AC power source is located and finds the corresponding firing angle according to the lookup table. In other embodiments, the MCU 30 may also store delay times instead of storing the firing angles. The delay time may be calculated based on the firing angle, the amplitude and frequency of the AC power source.

In the steps 901 and 902, the MCU may detect the voltage value of the AC power source 24 at a predetermined angle, and finds the corresponding firing angle according to the detected voltage value. The MCU may also detect current voltage value and the corresponding angle thereof, calculate the amplitude or effective voltage of the AC power source, and finds the corresponding firing angle from the lookup table according to the amplitude or the effective voltage value of the AC power source 24. The association between the voltage of the AC power source and the firing angle is not limited to the above-described two ways.

Step 903: detecting whether the voltage of the AC power source passes through zero voltage, step 904 is implemented when the voltage of the AC power source passes through zero voltage, and step 901 is implemented when the voltage of the AC power source does not pass through zero voltage.

Step 904: detecting the magnetic field of the rotor and the polarity of the AC power source, step 905 is implemented if the detected rotor magnetic field is South and the polarity of the AC power source is positive, or the detected rotor magnetic field is North and the polarity of the AC power source is negative. Otherwise, step 906 is implemented.

Step 905: the MCU 30 outputs the trigger pulse to the controllable bidirectional AC switch 26 after the firing angle or delay time after the zero voltage crossing point of the AC power source, then the process returns to step 901.

Step 906: the MCU 30 does not output the trigger pulse to the controllable bidirectional AC switch 26, the controllable bidirectional AC switch 26 will automatic shut off, then the process returns to step 901.

Figure 15:
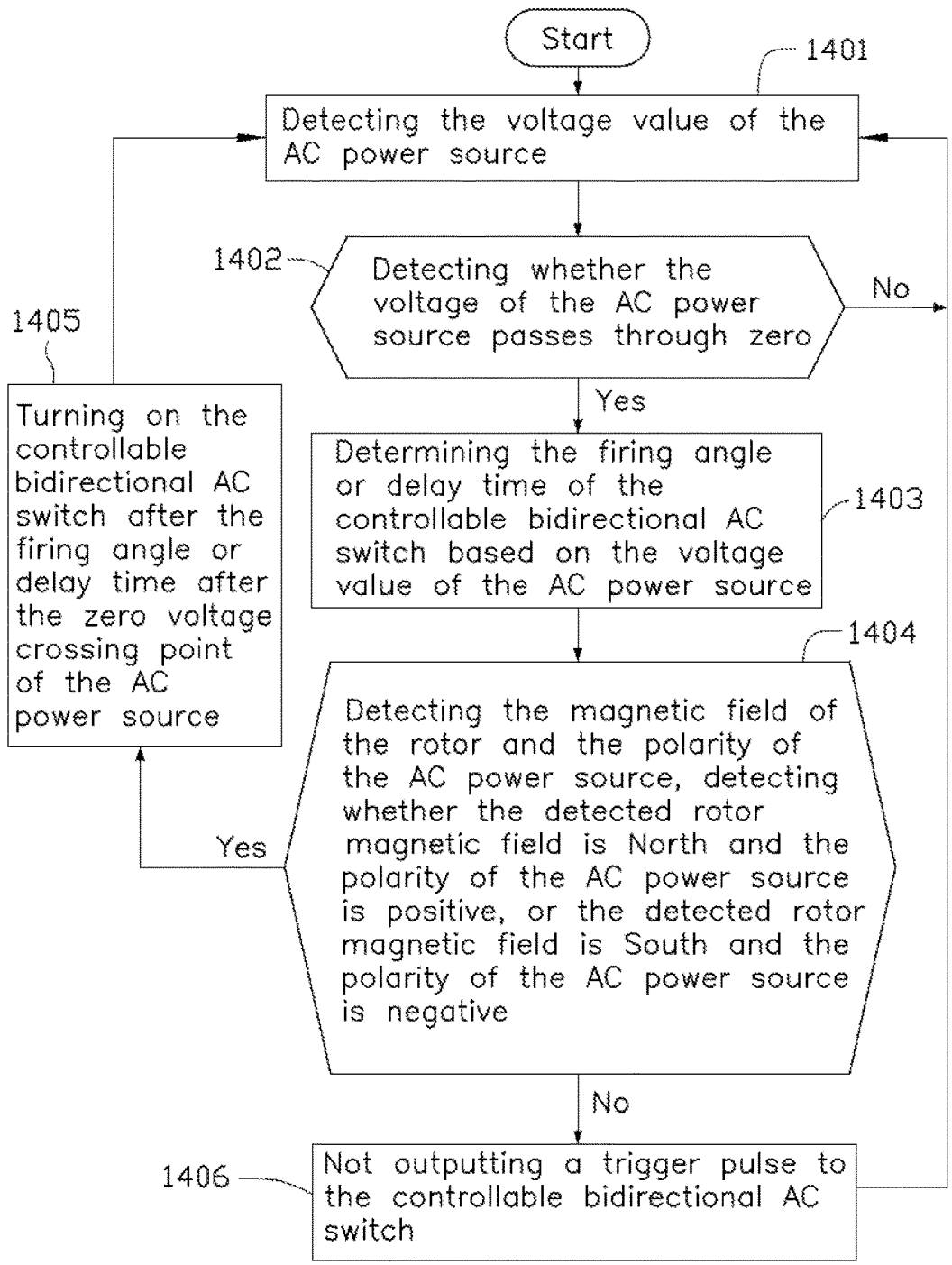
FIG. 15 is a flowchart of a motor driving method according to a third embodiment of the present disclosure.

FIG. 15 is a flowchart of a motor driving method according to a third embodiment of the present disclosure, the motor driving method includes:

Step 1401: Detecting the voltage value of the AC power source.

Step 1402: detecting whether the voltage of the AC power source passes through zero voltage, step 1403 is implemented when the voltage of the AC power source passes through zero voltage, and step 1401 is implemented when the voltage of the AC power source does not pass through zero voltage.

Step 1403: The MCU 30 determines the firing angle or delay time according to the voltage value of the AC power source 24.

In the steps 1401 and 1403, the MCU may detect the voltage value of the AC power source 24 at a predetermined angle, and finds the corresponding firing angle according to the detected voltage value. The MCU may also detect current voltage value and the corresponding angle thereof, calculate the amplitude or effective voltage of the AC power source, and finds the firing angle from the lookup table according to the amplitude or the effective voltage value of the AC power source 24. The association between the voltage of the AC power source and the firing angle is not limited to the above-described two ways.

Step 1404: detecting the magnetic field of the rotor and the polarity of the AC power source, step 1405 is implemented if the detected rotor magnetic field is North and the polarity of the AC power source is positive, or the detected rotor magnetic field is South and the polarity of the AC power source is negative. Otherwise, step 1406 is implemented.

Step 1405: the MCU 30 outputs the trigger pulse to the controllable bidirectional AC switch 26 after the firing angle or delay time after the zero voltage crossing point of the AC power source, then the process returns to step 1401.

Step 1406: the MCU 30 does not output a trigger pulse to the controllable bidirectional AC switch 26, the controllable bidirectional AC switch 26 will automatic shut off, then the process returns to step 1401.

Figure 16:
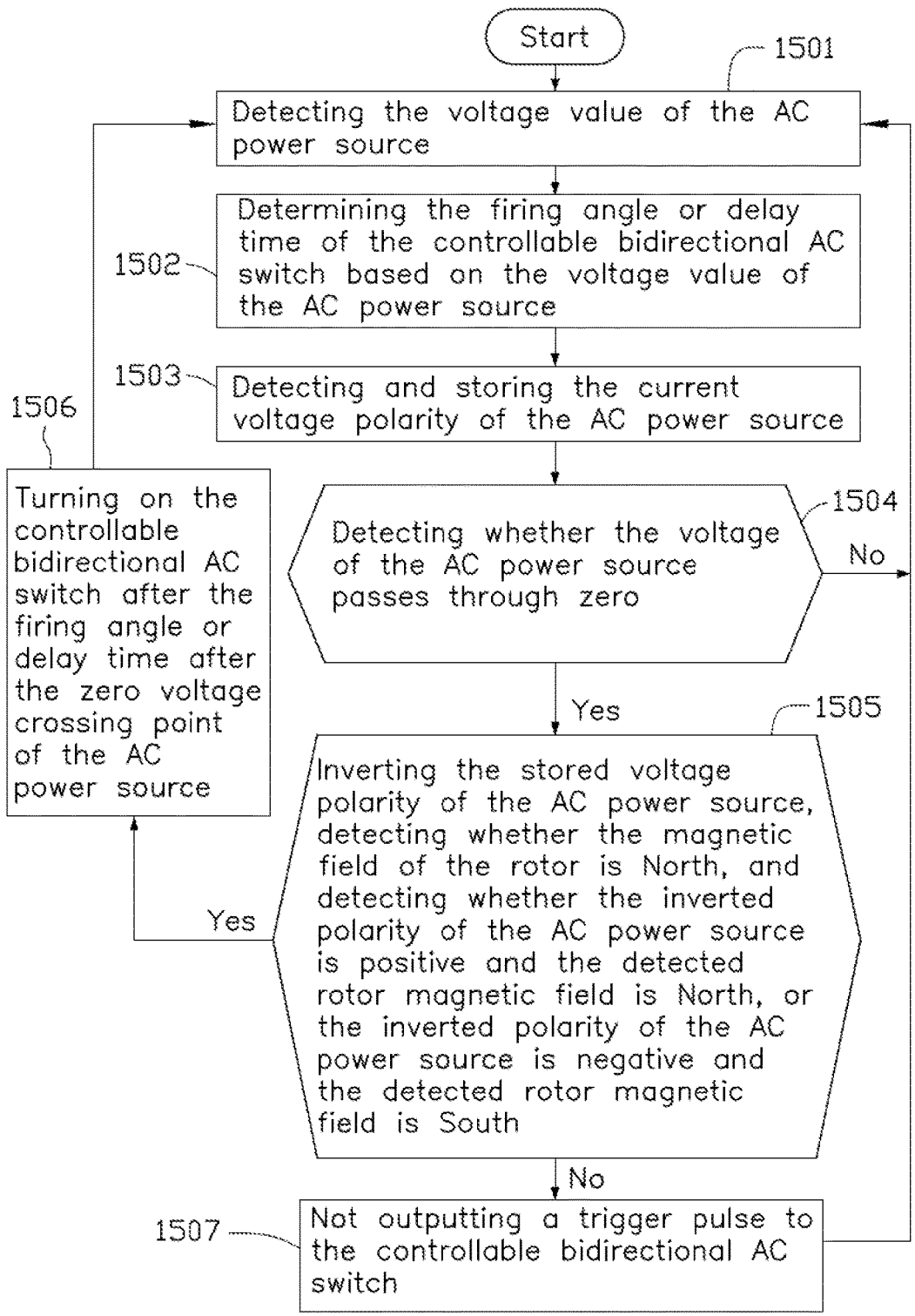
FIG. 16 is a flowchart of a motor driving method according to a fourth embodiment of the present disclosure.

FIG. 16 is a flowchart of a motor driving method according to a fourth embodiment of the present disclosure, the motor driving method includes:

Step 1501: Detecting the voltage value of the AC power source.

Step 1502: The MCU 30 determines the firing angle or delay time according to the voltage value of the AC power source 24.

In the steps 1501 and 1502, the MCU may detect the voltage value of the AC power source 24 at a predetermined angle, and find the corresponding firing angle according to the detected voltage value. The MCU may also detect current voltage value and the corresponding angle thereof, calculate the amplitude or effective voltage of the AC power source, and finds the firing angle from the lookup table according to the amplitude or the effective voltage value of the AC power source 24. The association between the voltage of the AC power source and the firing angle is not limited to the above-described two ways.

Step 1503: detecting and storing the current voltage polarity of the AC power source 24.

Step 1504: detecting whether the voltage of the AC power source passes through zero voltage, step 1505 is implemented when the voltage of the AC power source passes through zero voltage, and step 1501 is implemented when the voltage of the AC power source does not pass through zero voltage.

Step 1505: The MCU 30 inverts the stored voltage polarity of the AC power source 24, and detects whether the magnetic field of the rotor is North, step 1506 is implemented when the inverted polarity of the AC power source is positive and the detected rotor magnetic field is North, or the inverted polarity of the AC power source is negative and the detected rotor magnetic field is South. Otherwise, step 1507 is implemented.

Step 1506: the MCU 30 outputs the trigger pulse to the controllable bidirectional AC switch 26 after the firing angle or delay time after the zero voltage crossing point of the AC power source, then the process returns to step 1501.

1507: the MCU 30 does not output a trigger pulse to the controllable bidirectional AC switch 26, the controllable bidirectional AC switch 26 will automatic shut off, then the process returns to step 1501.

In the embodiments as shown in FIGS. 13-16, preferably, the step of detecting whether the voltage of the AC power source passes through zero voltage is continuous until detected.

Figure 17:
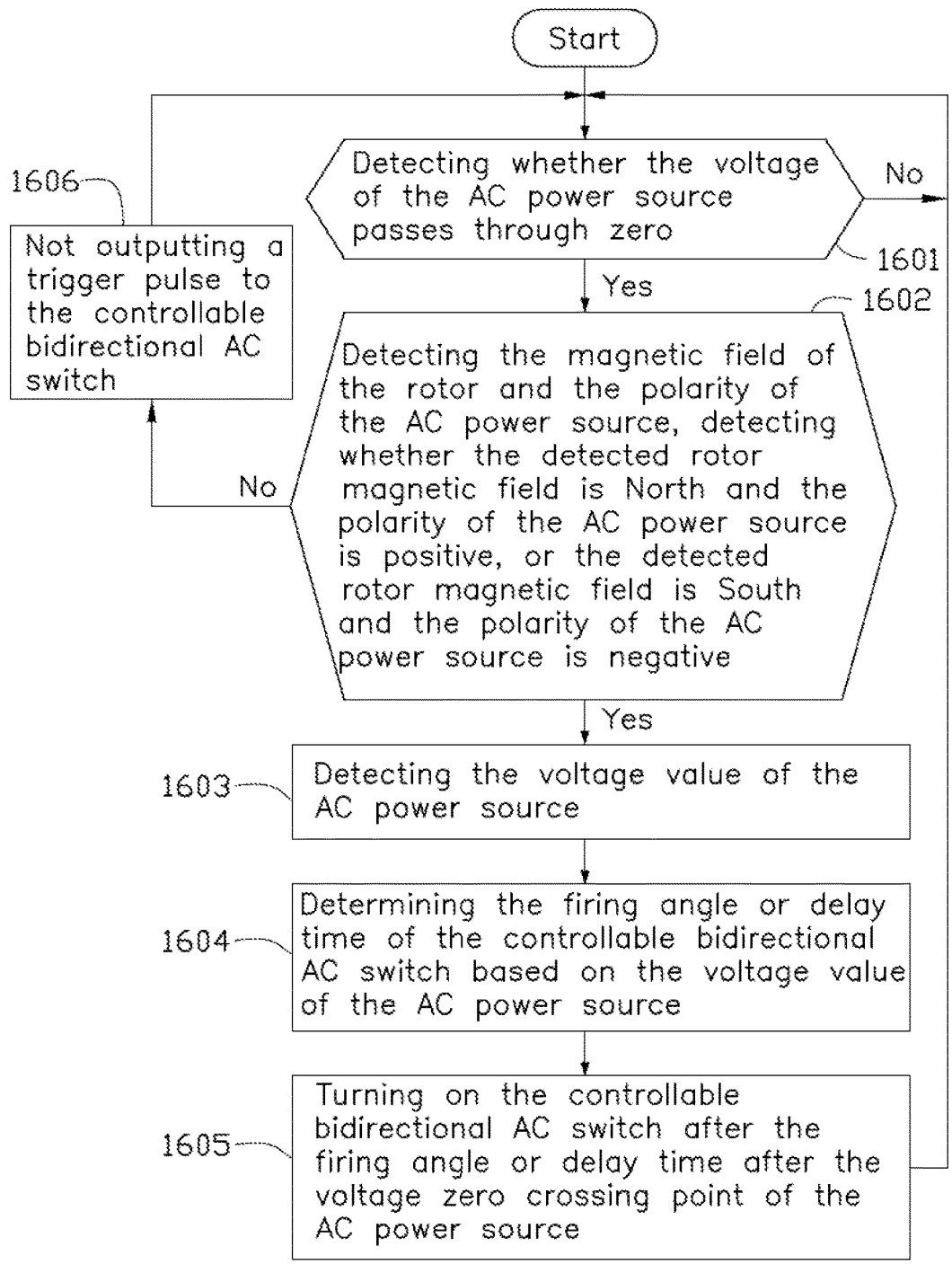
FIG. 17 is a flowchart of a motor driving method according to a fifth embodiment of the present disclosure.

FIG. 17 is a flowchart of a motor driving method according to a fifth embodiment of the present disclosure, the motor driving method includes:

Step 1601: detecting whether the voltage of the AC power source passes through zero voltage, step 1602 is implemented when the voltage of the AC power source passes through zero voltage, and step 1601 is implemented when the voltage of the AC power source does not pass through zero voltage. Step 1602: detecting the magnetic field of the rotor and the polarity of the AC power source, step 1603 is implemented when the detected rotor magnetic field is North and the polarity of the AC power source is positive, or the detected rotor magnetic field is South and the polarity of the AC power source is negative. Otherwise, step 1606 is implemented.

Step 1603: Detecting the voltage value of the AC power source.

Step 1604: The MCU 30 determines the firing angle or delay time according to the voltage value of the AC power source 24.

In the steps 1603 and 1604, the MCU may detect the voltage value of the AC power source 24 at a predetermined angle, and find the corresponding firing angle according to the detected voltage value. The MCU may also detect current voltage value and the corresponding angle thereof, calculate the amplitude or effective voltage of the AC power source, and finds the firing angle from the lookup table according to the amplitude or the effective voltage value of the AC power source 24. The association between the voltage of the AC power source and the firing angle is not limited to the above-described two ways.

Step 1605: the MCU 30 outputs the trigger pulse to the controllable bidirectional AC switch 26 after the firing angle or delay time after the zero voltage crossing point of the AC power source, then the process returns to step 1601.

Step 1606: the MCU 30 does not output a trigger pulse to the controllable bidirectional AC switch 26, the controllable bidirectional AC switch 26 will automatic shut off, then the process returns to the step 1601.

In the above embodiments, the frequency of detecting the voltage value of the AC power source and the frequency of determining the firing angle according to the voltage value of the AC power source can be adjusted according to design requirements.

In the above embodiments, the steps of detecting whether the voltage of the AC power source passes through zero voltage and detecting the magnetic field of the rotor and the polarity of the AC power source, can be separately implemented with the steps of detecting the voltage value of the AC power source and determining the firing angle of delay time, that is, the order of the steps is not limited. For example, the MCU outputs an interrupt signal when the voltage of the AC power source passes through zero voltage, and the magnetic field of the rotor and the polarity of the AC power source are detected when the interrupt signal is generated. In the above embodiments, the trigger angle or the delay time is determined based on the voltage value of the AC power source, it can be understood that, in other embodiments, the trigger angle or the delay time also can be determined based on at least one parameter selected from the group consisting of voltage value of the AC power source, frequency of the AC power source, temperature of environment surrounding the motor, and temperature of the processing unit. In addition, if the firing angle or the delay time is determined based on the inductance value of the stator winding, it is not necessary for repeatedly reading the inductance value, the inductance value of the stator winding is obtained once.

Figure 18:
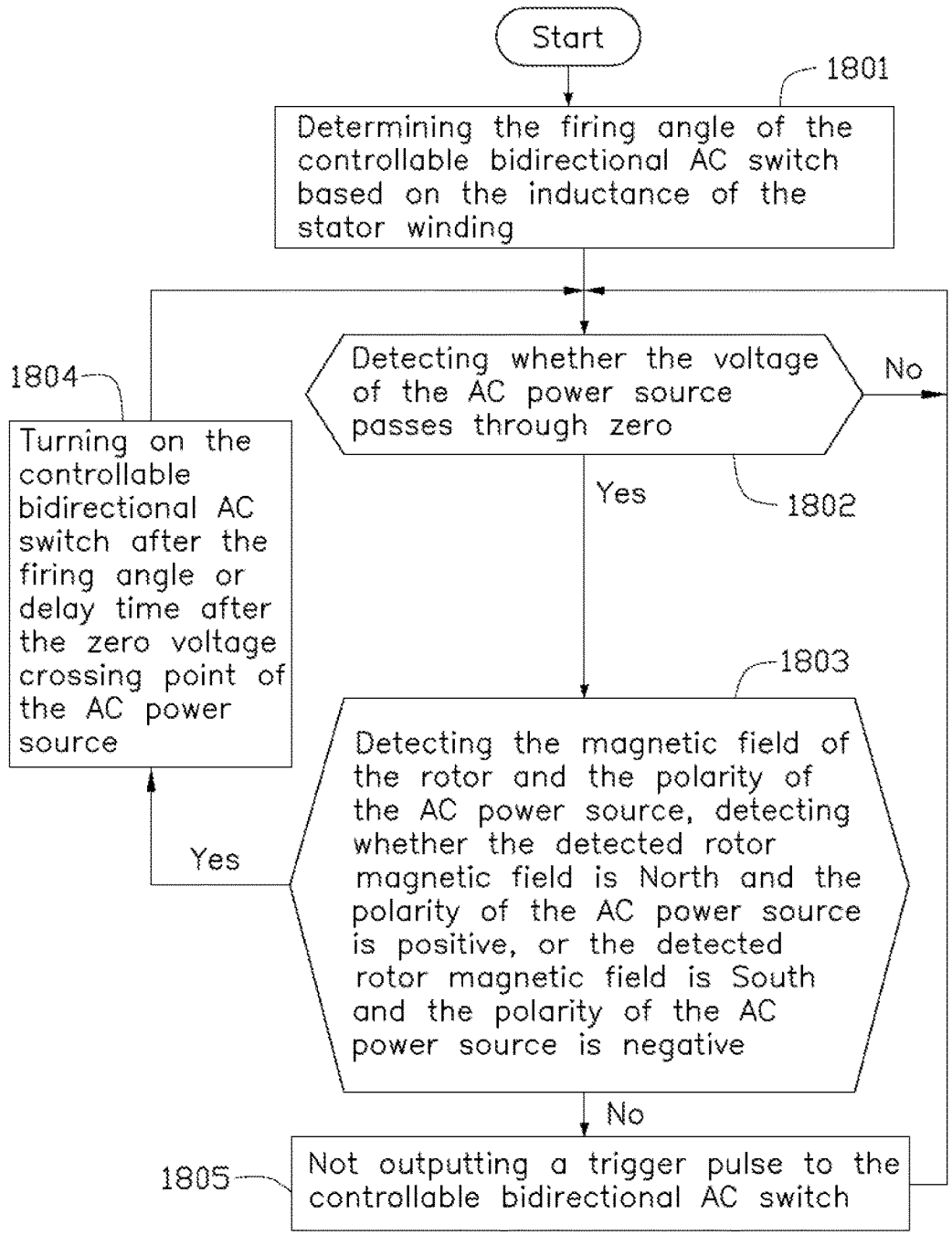
FIG. 18 is a flowchart of a motor driving method according to a sixth embodiment of the present disclosure.

FIG. 18 is a flowchart of a motor driving method according to a sixth embodiment of the present disclosure, and schematically illustrates an embodiment for determining the firing angle by the inductance of the stator winding. The motor driving method includes:

Step 1801: The MCU 30 determines the firing angle according to the inductance of the stator winding.

In the embodiment, the inductance value of the stator winding may be pre-stored in the MCU 30, so that the MCU 30 acquires the inductance value in advance. The MCU 30 may also store a lookup table including the parameters about the inductance value of the stator winding and the corresponding firing angle. In the lookup table, there are a plurality of inductance value ranges, each of which corresponds to a firing angle, the MCU 30 determines the inductance value range in which the inductance value of the stator winding is located and finds the corresponding firing angle according to the lookup table.

Step 1802: detecting whether the voltage of the AC power source passes through zero voltage, step 1803 is implemented when the voltage of the AC power source passes through zero voltage, and step 1802 is implemented when the voltage of the AC power source does not pass through zero voltage.

Step 1803: detecting the magnetic field of the rotor and the polarity of the AC power source, step 1804 is implemented when the detected rotor magnetic field is North and the polarity of the AC power source is positive, or the detected rotor magnetic field is South and the polarity of the AC power source is negative. Otherwise, step 1805 is implemented.

Step 1804: the MCU 30 outputs the trigger pulse to the controllable bidirectional AC switch 26 after the firing angle after the zero voltage crossing point of the AC power source, then the process returns to the step 1802.

Step 1805: the MCU 30 does not output a trigger pulse to the controllable bidirectional AC switch 26, the controllable bidirectional AC switch 26 will automatic shut off, then the process returns to the step 1802.

FIG. 18 is provided by way of example only, and in other embodiments, some of the steps may be reversed, and the two adjacent steps are not necessarily continuous.

It can be understood, the motor described in the embodiments of the present disclosure is suitable for driving fans, water pumps, and electric vehicles (the electric vehicle includes a low or high voltage AC power supplies, otherwise an inverter is required to drive the permanent magnet AC motor). The motor according to the embodiments of the present disclosure is a AC motor with permanent magnet rotor, such as synchronous motor and BLDC motor. The motor according to the embodiments of the present disclosure is preferably a single-phase AC motor with permanent magnet rotor, such as a single-phase synchronous motor and a single-phase BLDC motor. When the motor is a synchronous motor; the AC power source may be commercial AC power supply. When the motor is a BLDC motor, the AC power source may be provided by an inverter.

In the embodiments of the present disclosure, the motor may produce a desired torque as far as possible, power consumption due to negative torque acting against positive torque may be decreased, therefore improving the motor power efficiency, and strengthening resource conservation and environmental protection.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A driving circuit for a motor comprising a stator and a permanent magnet rotor, the stator comprising a stator core and a stator winding wound on the stator core, wherein the driving circuit comprises:
   a controllable bidirectional AC switch connected in series with the stator winding between two ends of an AC power source;
   a position sensor which is configured to detect a magnetic pole position of the permanent magnet rotor; and
   a processing unit, configured to detect a zero voltage crossing point and a voltage polarity of the AC power source, and control the controllable bidirectional AC switch to be switched between a switch-on state and a switch-off state in a predetermined way, based on the magnetic pole position of the permanent magnet rotor and the voltage polarity of the AC power source; when the controllable bidirectional AC switch is to be switched to the switch-on state, the processing unit outputs a trigger pulse to the controllable bidirectional AC switch after a delay time after the zero voltage crossing point, such that a phase difference between a back electromotive force and a current flowing through the stator winding is decreased;
   wherein the driving circuit further comprises a lookup table which stores a plurality of voltage values and a plurality of corresponding delay times, the voltage values respectively represent a series of AC power sources, and the processing unit reads the delay time from the lookup table according to a voltage value of the AC power source of the driving circuit.

2. The driving circuit of claim 1, wherein, in the lookup table, the delay time increases as the voltage value increases.

3. The driving circuit of claim 2, wherein the position sensor is a switch type Hall sensor.

4. The driving circuit of claim 3, wherein the position sensor and the processing unit are integrated in an integrated circuit.

5. The driving circuit of claim 2, wherein the voltage values stored in the lookup table are amplitudes or effective values of the series of AC power sources, the processing unit detects a the voltage value of the AC power source of the driving circuit and a corresponding angle thereof, calculates an effective value or an amplitude of the AC power source, and reads the delay time according to the calculated effective value or the amplitude.

6. The driving circuit of claim 2, wherein the voltage values stored in the lookup table are voltage values of the series of AC power sources at a predetermined angle, the processing unit reads the delay time according to the voltage value of the AC power source of the driving circuit at the predetermined angle.

7. The driving circuit of claim 1, wherein when a detected magnetic field of the permanent magnet rotor at the zero voltage crossing point is North and the polarity of the AC power source following the zero voltage crossing point is positive, or when the detected magnetic field of the permanent magnet rotor at the zero voltage crossing point is South and the polarity of the AC power source following the zero voltage crossing point is negative, the processing unit outputs the trigger pulse to the controllable bidirectional AC switch after the delay time after the zero voltage crossing point.

8. The driving circuit of claim 7, wherein the processing unit does not output the trigger pulse to the controllable bidirectional AC switch when the detected magnetic field of the permanent magnet rotor at the zero voltage crossing point is North and the polarity of the AC power source following the zero voltage crossing point is negative, or when the detected magnetic field of the permanent magnet rotor at the zero voltage crossing point is South and the polarity of the AC power source following the zero voltage crossing point is positive.

9. The driving circuit of claim 1, wherein when the a detected magnetic field of the permanent magnet rotor at the zero voltage crossing point is South and the polarity of the AC power source following the zero voltage crossing point is positive, or when the detected magnetic field of the permanent magnet rotor at the zero voltage crossing point is North and the polarity of the AC power source following the zero voltage crossing point is negative, the processing unit outputs the trigger pulse to the controllable bidirectional AC switch after the delay time after the zero voltage crossing point.

10. The driving circuit of claim 9, wherein the processing unit does not output the trigger pulse to the controllable bidirectional AC switch when the detected magnetic field of the permanent magnet rotor at the zero voltage crossing point is North and the polarity of the AC power source following the zero voltage crossing point is positive, or when the detected magnetic field of the permanent magnet rotor at the zero voltage crossing point is South and the polarity of the AC power source following the zero voltage crossing point is negative.

11. The driving circuit of claim 1, wherein the controllable bidirectional AC switch is a TRIAC, a first anode of the TRIAC is grounded or receives a low direct current voltage, the first anode of the TRIAC is also connected to a first end of the AC power source, a second anode of the TRIAC is connected to a second end of the AC power source via the stator winding and a fuse, and a control electrode of the TRIAC is connected to the processing unit via a resistor.

12. The driving circuit of claim 1, wherein the processing unit is a microcontroller unit, an application specific integrated circuit, a programmable logic device, or a programmable array logic.

13. The driving circuit of claim 1, wherein the processing unit comprises a zero crossing detection end and a voltage polarity detection end, the voltage polarity detection end is connected to an end of the AC power source via a first resistor and also grounded via a second resistor, and the zero crossing detection end is configured in one of the following ways:
the zero crossing detection end is connected to the voltage polarity detection end;
the zero crossing detection end is connected to the AC power source via a third resistor; and
the zero crossing detection end detects the zero voltage crossing point of the AC power source through optical coupling or electric-field coupling.

14. The driving circuit of claim 13, wherein the zero crossing detection end or the voltage polarity detection end comprises a voltage clamping circuit.

15. A motor, comprising stator, a permanent magnet rotor, and the driving circuit of claim 1.

16. A motor driving method, comprising:
a. obtaining a magnetic pole position of a permanent magnet rotor and a voltage polarity of an AC power source; and
b. when a controllable bidirectional AC switch connected in series with a stator winding between two ends of the AC power source is to be turned on, based on the magnetic pole position of the rotor and the polarity of the AC power source, outputting a trigger pulse to the controllable bidirectional AC switch after a delay time after a zero voltage crossing point of the AC power source, such that a phase difference between a back electromotive force and current flowing through the stator winding is decreased;
wherein a plurality of voltage values and a plurality of corresponding delay times are pre-stored into a lookup table, the voltage values respectively represent a series of AC power sources, and the step b further comprises reading the delay time from the lookup table according to a voltage value of the AC power source connected to the stator winding.

17. The driving method of claim 16, wherein the step of obtaining a magnetic pole position of a permanent magnet rotor and a voltage polarity of an AC power source comprises:
detecting a zero voltage crossing point of the AC power source; and
obtaining a magnetic field of the rotor at the zero voltage crossing point, and the voltage polarity of the AC power source following the zero crossing point.

18. The driving method of claim 17, wherein the voltage values pre-stored in the lookup table are amplitudes or effective values of the series of AC power sources, and the step b comprising reading the delay time according to the effective value or the amplitude of the AC power source connected to the stator winding.

19. The driving method of claim 17, further comprising:
periodically detecting the voltage value of the AC power source connected to the stator winding, and
periodically determining the delay time according to the detected voltage value of the AC power source.

20. The driving method of claim 17, wherein the voltage values pre-stored in the lookup table are voltage values of the series of AC power sources at a predetermined angle and the step b comprising reading the delay time according to the voltage value of the AC power source connected to the stator winding at the predetermined angle.

* * * * *